United States Patent
Atkins

(10) Patent No.: US 12,413,693 B2
(45) Date of Patent: Sep. 9, 2025

(54) PROCESSING OF EXTENDED DIMENSION LIGHT FIELD IMAGES

(71) Applicant: DOLBY LABORATORIES LICENSING CORPORATION, San Francisco, CA (US)

(72) Inventor: Robin Atkins, Vancouver (CA)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 5 days.

(21) Appl. No.: 18/255,583

(22) PCT Filed: Dec. 2, 2021

(86) PCT No.: PCT/US2021/061683
§ 371 (c)(1),
(2) Date: Jun. 1, 2023

(87) PCT Pub. No.: WO2022/120104
PCT Pub. Date: Jun. 9, 2022

(65) Prior Publication Data
US 2024/0031543 A1 Jan. 25, 2024

Related U.S. Application Data

(60) Provisional application No. 63/121,372, filed on Dec. 4, 2020.

(30) Foreign Application Priority Data

Dec. 4, 2020 (EP) ..................... 20211870

(51) Int. Cl.
H04N 13/117 (2018.01)
H04N 13/00 (2018.01)
(Continued)

(52) U.S. Cl.
CPC ......... *H04N 13/117* (2018.05); *H04N 13/178* (2018.05); *H04N 13/232* (2018.05);
(Continued)

(58) Field of Classification Search
CPC ..... G06F 3/011; G06T 15/205; H04N 13/117; H04N 13/15; H04N 13/178; H04N 13/232;
(Continued)

(56) References Cited

U.S. PATENT DOCUMENTS 9,031,343 B2   5/2015   Venkataraman
10,085,005 B2  9/2018   Pitts
(Continued)

FOREIGN PATENT DOCUMENTS

EP   3065394 A1   9/2016
JP   2008259171 A   10/2008
(Continued)

OTHER PUBLICATIONS

Chih-Chen Kao, Efficient Synthetic Light Field Rendering on Heterogeneous Systems Using a Pipeline-Based Runtime Design, In Proceedings of the International Conference on Research in Adaptive and Convergent Systems (RACS '17), 2017, pp. 94-99, New York, NY, USA.
(Continued)

*Primary Examiner* — Christopher S Kelley
*Assistant Examiner* — Ana Picon-Feliciano

(57) ABSTRACT

In one embodiment, methods, media, and systems process and display light field images using a view function that is based on pixel locations in the image and on the viewer's distance (observer's Z position) from the display. The view function can be an angular view function that specifies different angular views for different pixels in the light field image based on the inputs that can include: the x or y pixel
(Continued)

location in the image, the viewer's distance from the display, and the viewer's angle relative to the display. In one embodiment, light field metadata, such as angular range metadata and/or angular offset metadata can be used to process and display the image. In one embodiment, color volume mapping metadata can be used to adjust color volume mapping based on the determined angular views; and the color volume mapping metadata can also be adjusted based on angular offset metadata.

18 Claims, 16 Drawing Sheets

(51) Int. Cl.
*H04N 13/178* (2018.01)
*H04N 13/232* (2018.01)
*H04N 13/366* (2018.01)
*H04N 13/388* (2018.01)
*H04N 23/957* (2023.01)

(52) U.S. Cl.
CPC ......... *H04N 13/366* (2018.05); *H04N 13/388* (2018.05); *H04N 23/957* (2023.01); *H04N 2013/0077* (2013.01)

(58) Field of Classification Search
CPC .. H04N 13/282; H04N 13/366; H04N 13/373; H04N 13/376; H04N 13/388; H04N 2013/0077; H04N 23/957
USPC ......................................................... 348/43
See application file for complete search history.

(56) References Cited

U.S. PATENT DOCUMENTS

| | | | |
|---|---|---|---|
| 10,395,624 B2 | 8/2019 | Sun | |
| 10,600,166 B2 | 3/2020 | Pytlarz | |
| 10,623,723 B2 | 4/2020 | Ratcliff | |
| 10,636,201 B2 | 4/2020 | Mitchell | |
| 10,650,573 B2 | 5/2020 | Youngquist | |
| 2014/0118512 A1* | 5/2014 | Park | H04N 13/366 348/54 |
| 2017/0244948 A1* | 8/2017 | Pang | H04N 23/957 |
| 2018/0352209 A1 | 12/2018 | Liu | |
| 2019/0082168 A1* | 3/2019 | Lee | H04N 13/31 |
| 2019/0313067 A1 | 10/2019 | Richards | |
| 2019/0320186 A1 | 10/2019 | Liu | |
| 2020/0106959 A1 | 4/2020 | Molina | |
| 2020/0195914 A1* | 6/2020 | Langois | H04N 13/344 |
| 2020/0226736 A1* | 7/2020 | Kar | H04N 13/271 |
| 2020/0226816 A1 | 7/2020 | Kar | |
| 2023/0217067 A1 | 7/2023 | Atkins | |

FOREIGN PATENT DOCUMENTS

| | | |
|---|---|---|
| JP | 2013539610 A | 10/2013 |
| JP | 2014093779 A | 5/2014 |
| JP | 2016042689 A | 3/2016 |
| JP | 2017011520 A | 1/2017 |
| JP | 2018514969 A | 6/2018 |
| JP | 2019054513 A | 4/2019 |
| JP | 2020167709 A | 10/2020 |
| WO | 9849667 A2 | 11/1998 |
| WO | 1998049667 | 11/1998 |
| WO | 2012004709 A1 | 1/2012 |

OTHER PUBLICATIONS

G. Wu et al., Light Field Image Processing: An Overview, IEEE Journal of Selected Topics in Signal Processing, Oct. 2017, pp. 926-954, vol. 11, No. 7, doi: 10.1109/JSTSP.2017.2747126.

Marc Levoy et al, Light Field Rendering, SIGGRAPH '96: Proceedings of the 23rd annual conference on Computer graphics and interactive techniques, 2023, pp. 31-42, vol. 2 (1st ed.), Association for Computing Machinery, New York, NY, USA.

Mildenhall Ben et al., Local Light Field Fusion: Practical View Synthesis with Prescriptive Sampling Guidelines, ACM Transactions on Graphics, Jul. 2019, pp. 1-14, vol. 38, No. 4.

Pratul P. Srinivasan et at., Learning to Synthesize a 4D RGBD Light Field from a Single Image, 2017 IEEE International Conference on Computer Vision (ICCV), 2017, pp. 2262-2270, Venice, Italy.

Shaoping Lu et al., A survey on multiview video synthesis and editing, Tsinghua Science and Technology, Dec. 2016, pp. 678-695, vol. 21, No. 6, Retrieved from the Internet: URL:https://ieeexplore.ieee.org/ielx7/5971803/7786999/07787010.pdf?tp=&arnumber=7787010&isnumber=7786999&ref=>.

Taguchi Y et al., TransCAIP: A Live 3D TV System Using a Camera Array and an Integral Photography Display with Interactive Control of Viewing Parameters, IEEE Transactions on Visualization and Computer Graphics, Sep./ Oct. 2009, pp. 841-852, vol. 15, No. 5 IEEE Computer Society.

Zhang C. et al., A survey on image-based rendering-representation, sampling and compression, 2004, pp. 1-28, Signal Processing: Image Communication, Elsevier, USA.

* cited by examiner

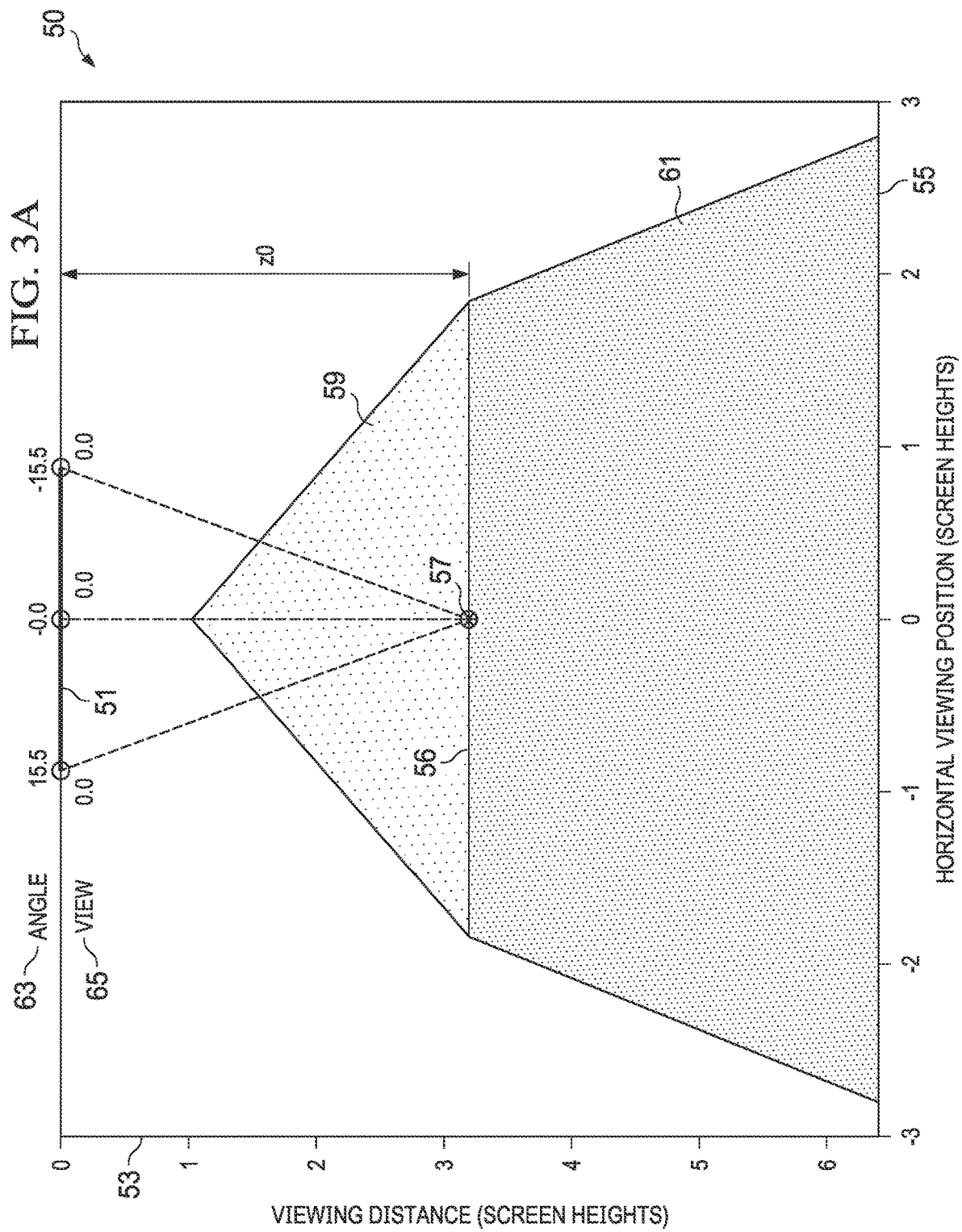

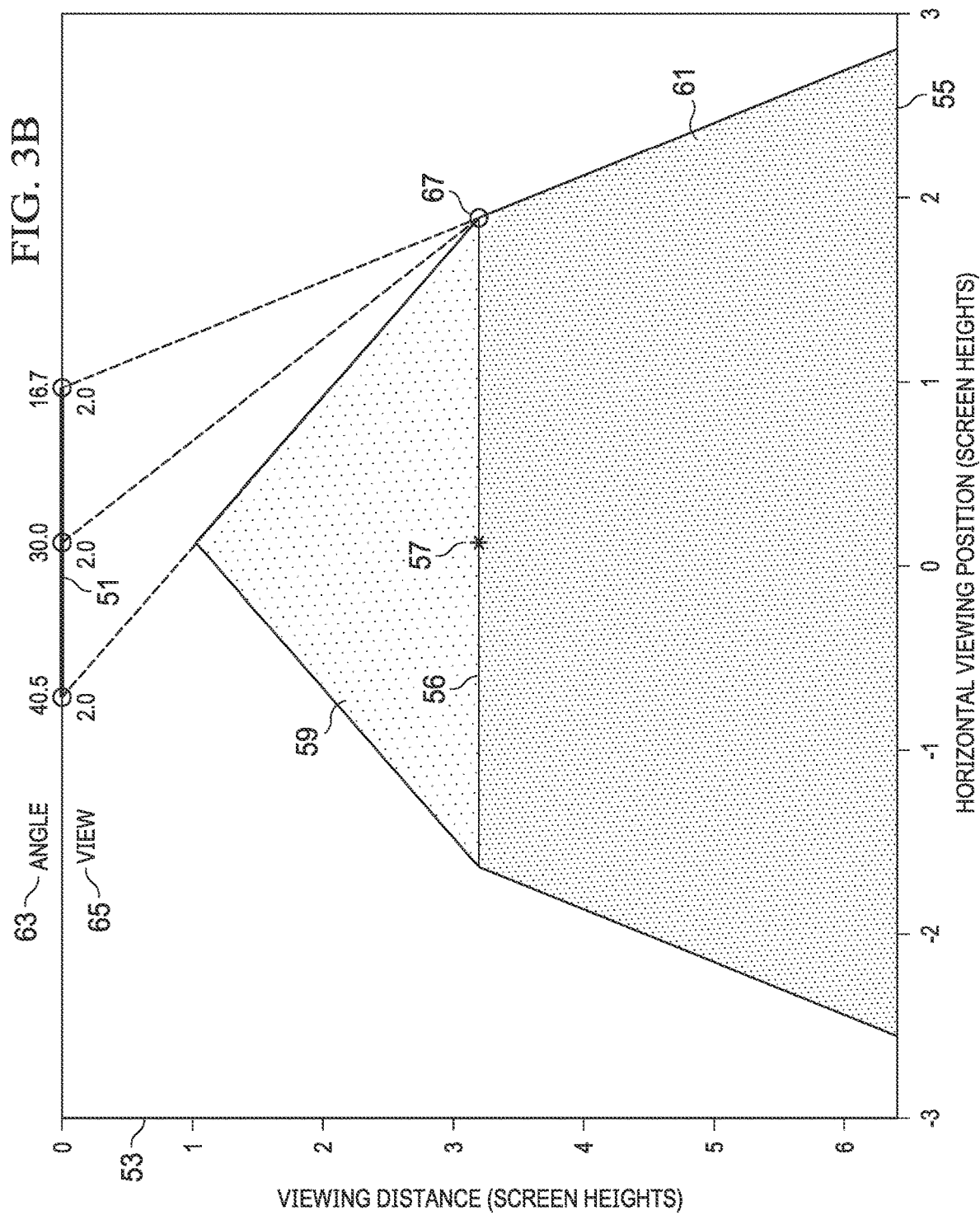

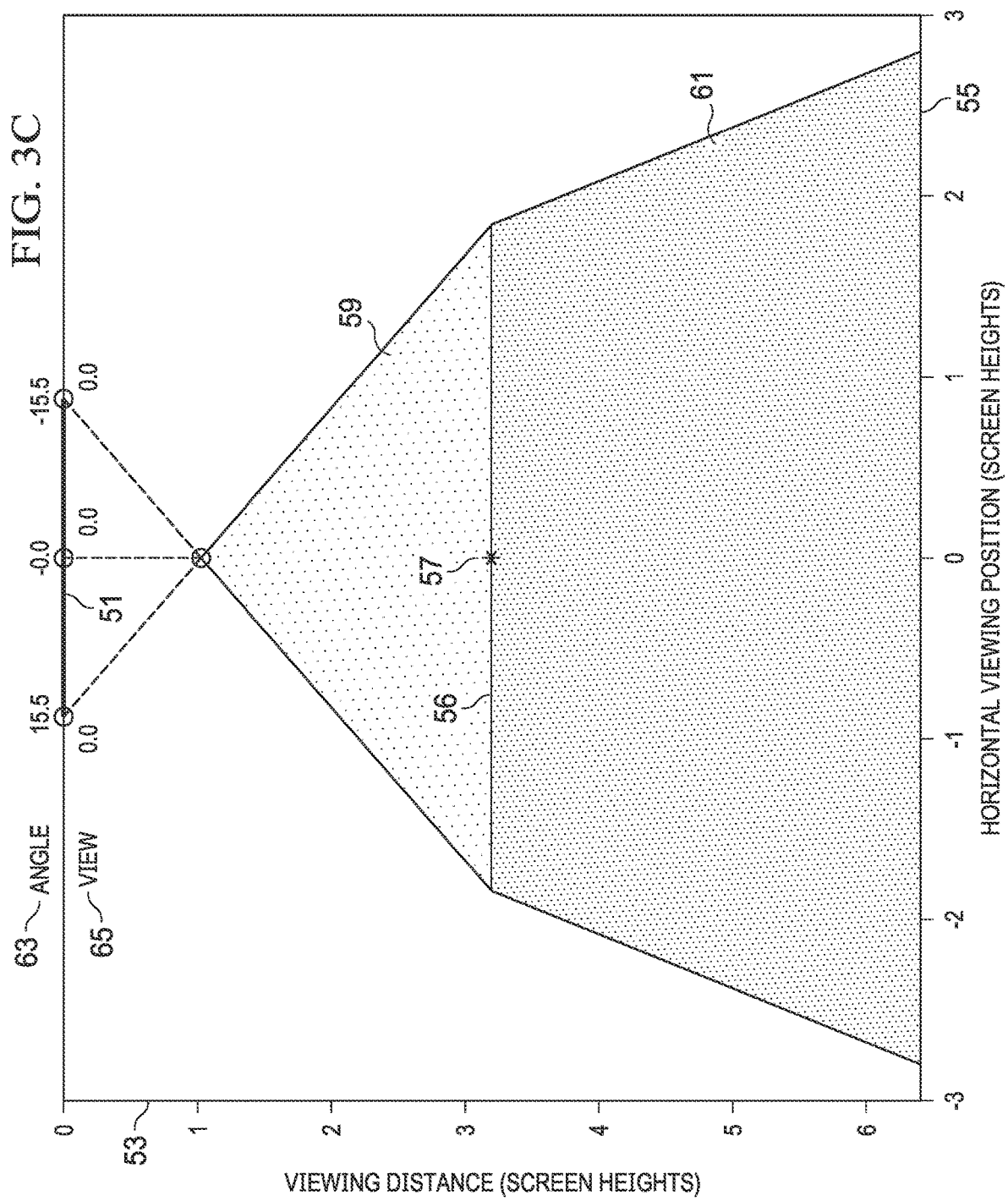

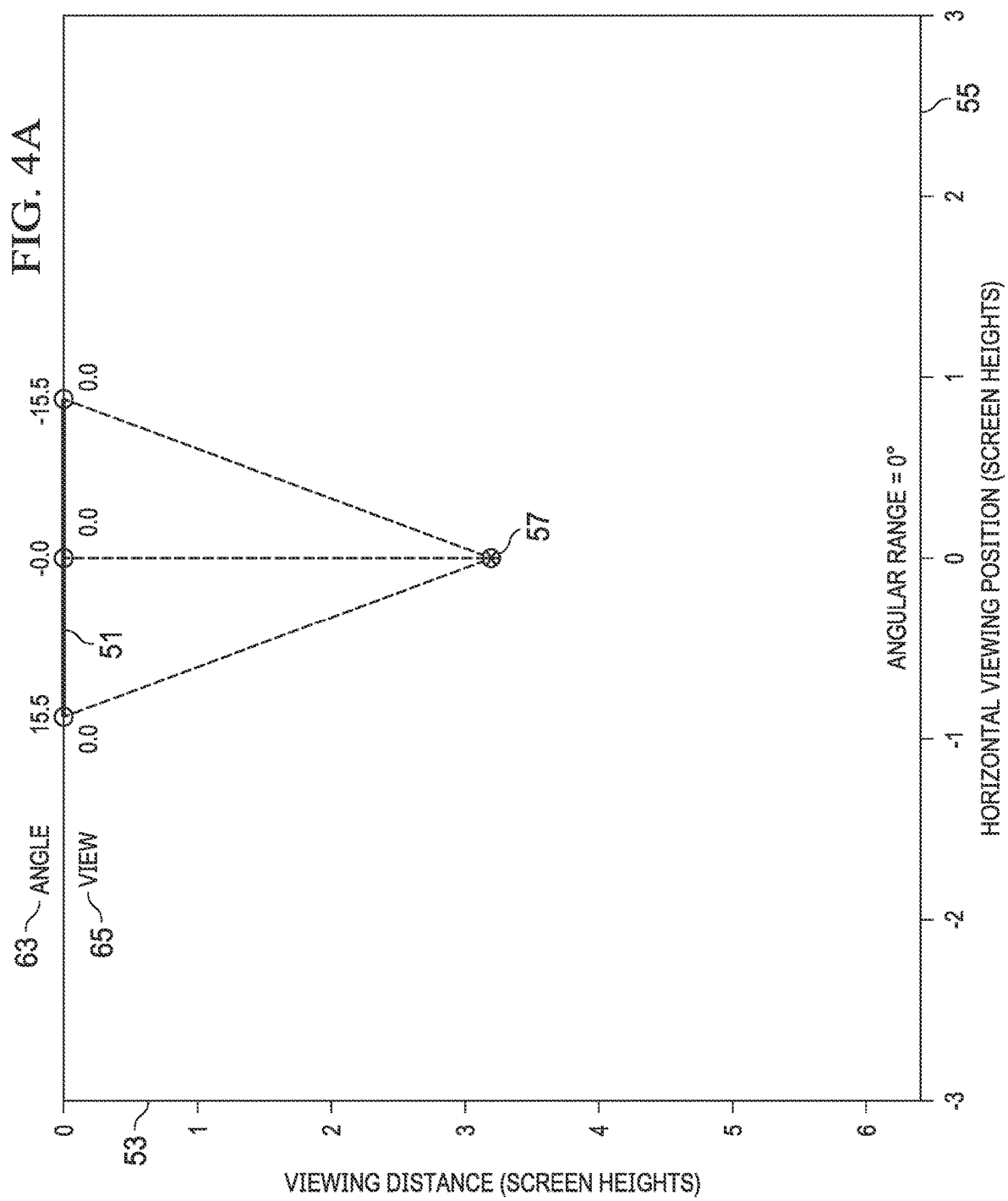

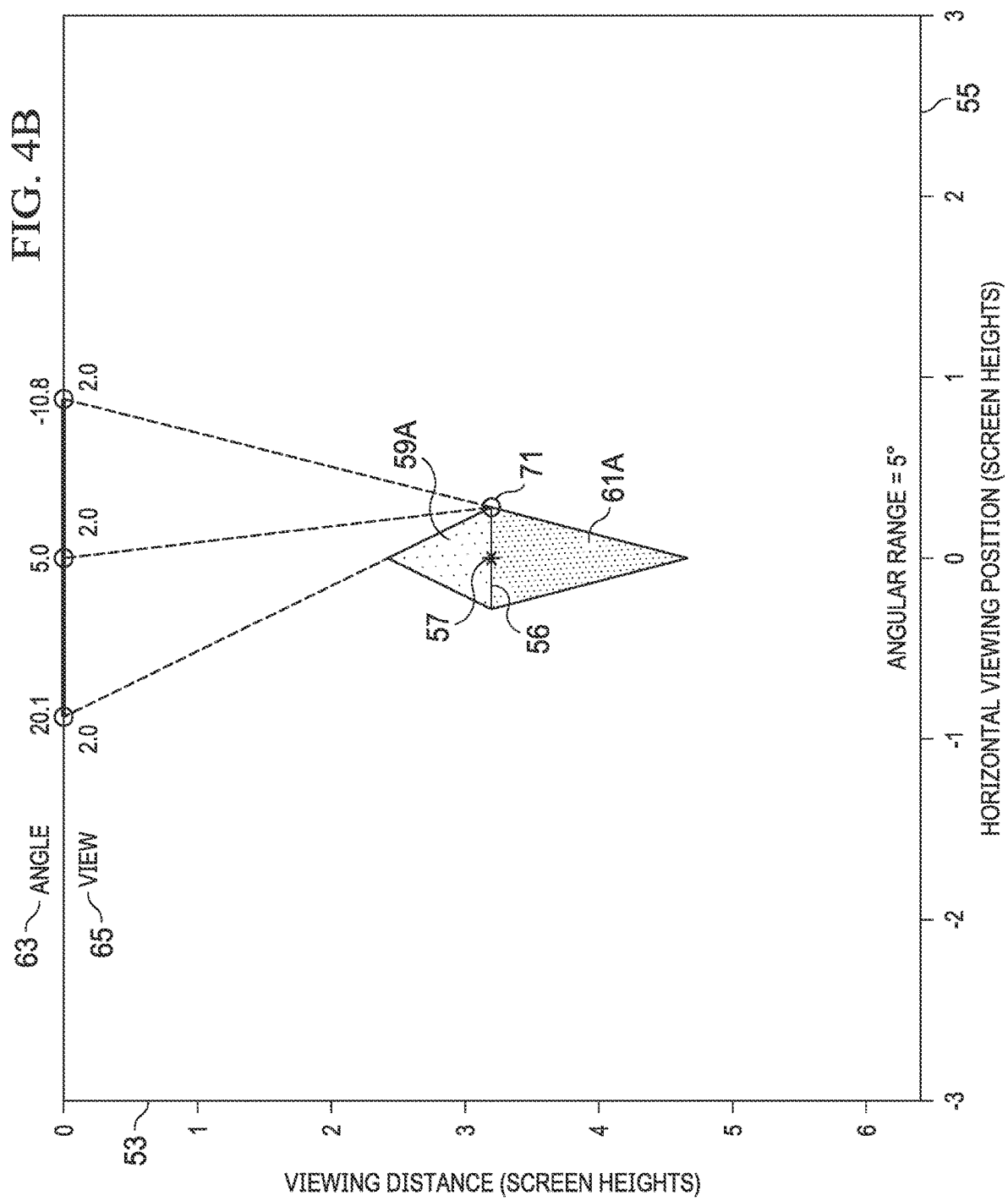

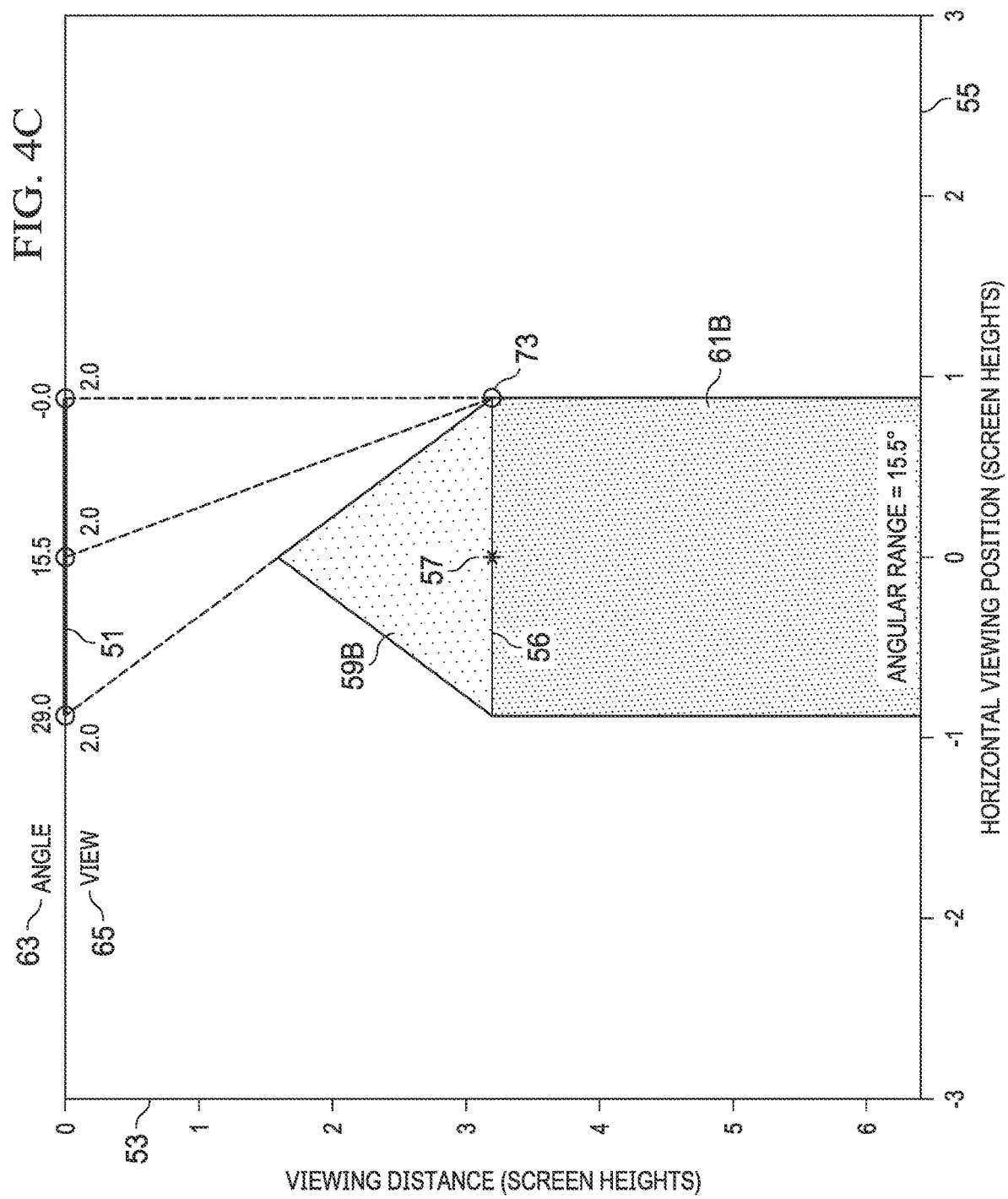

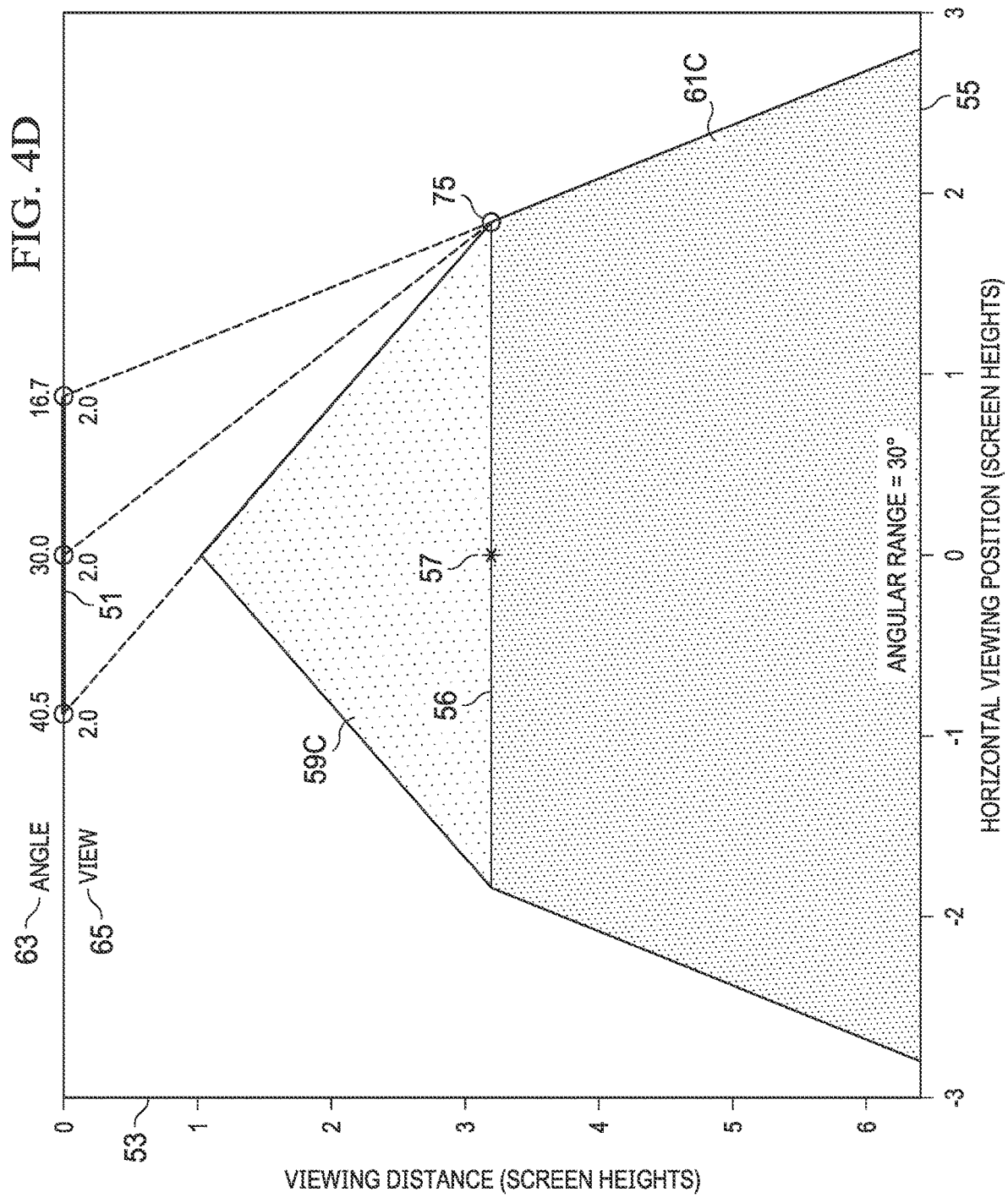

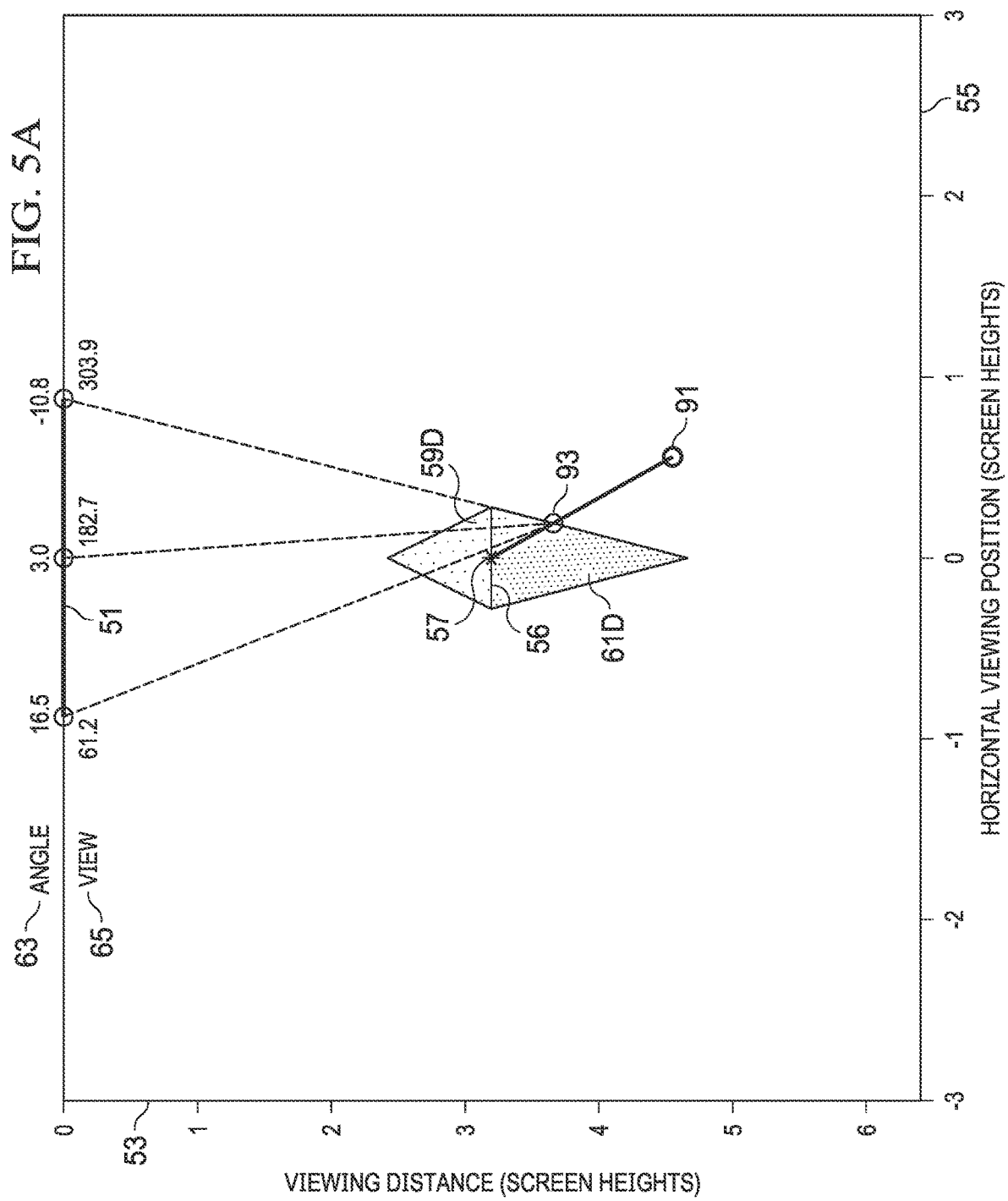

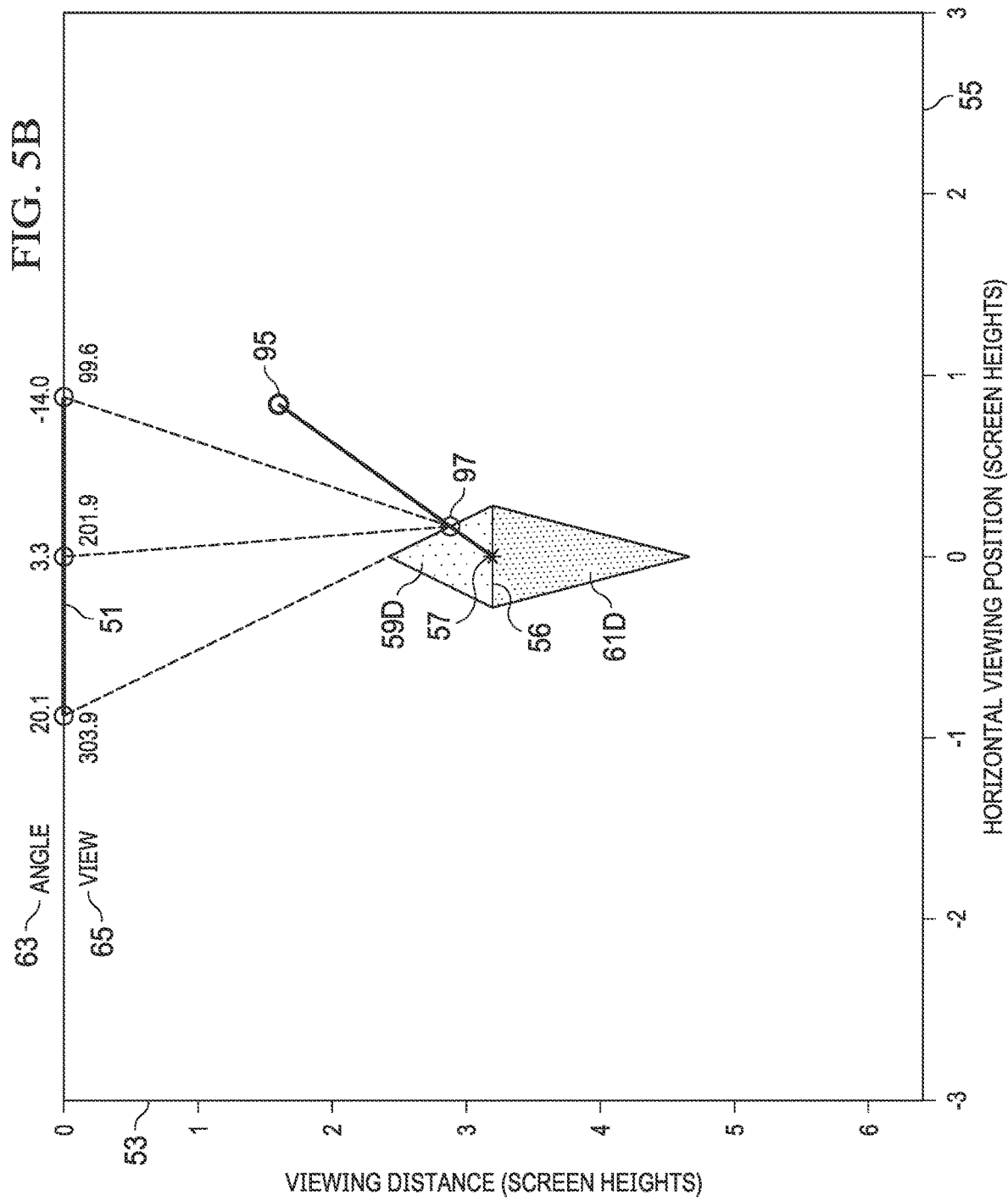

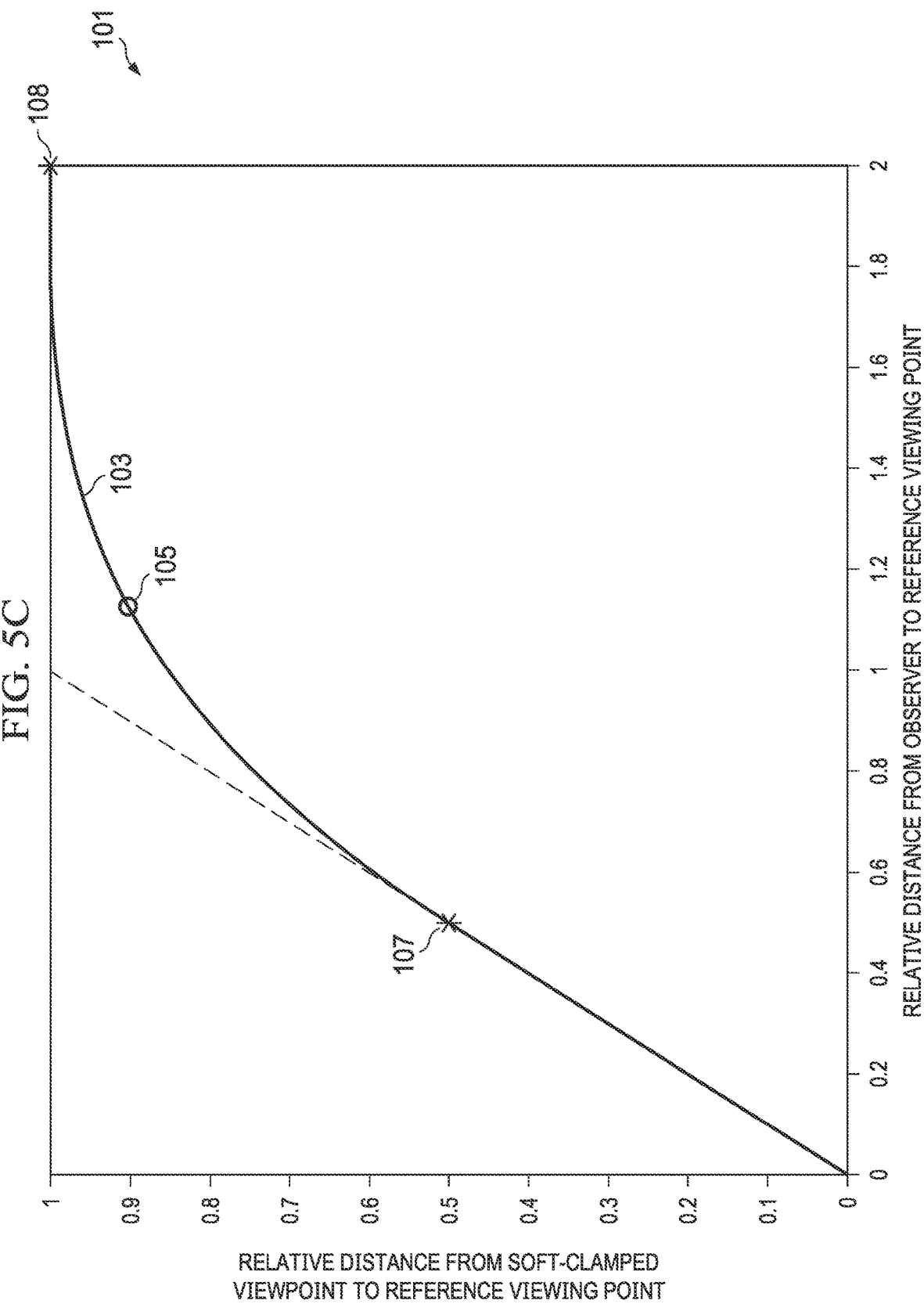

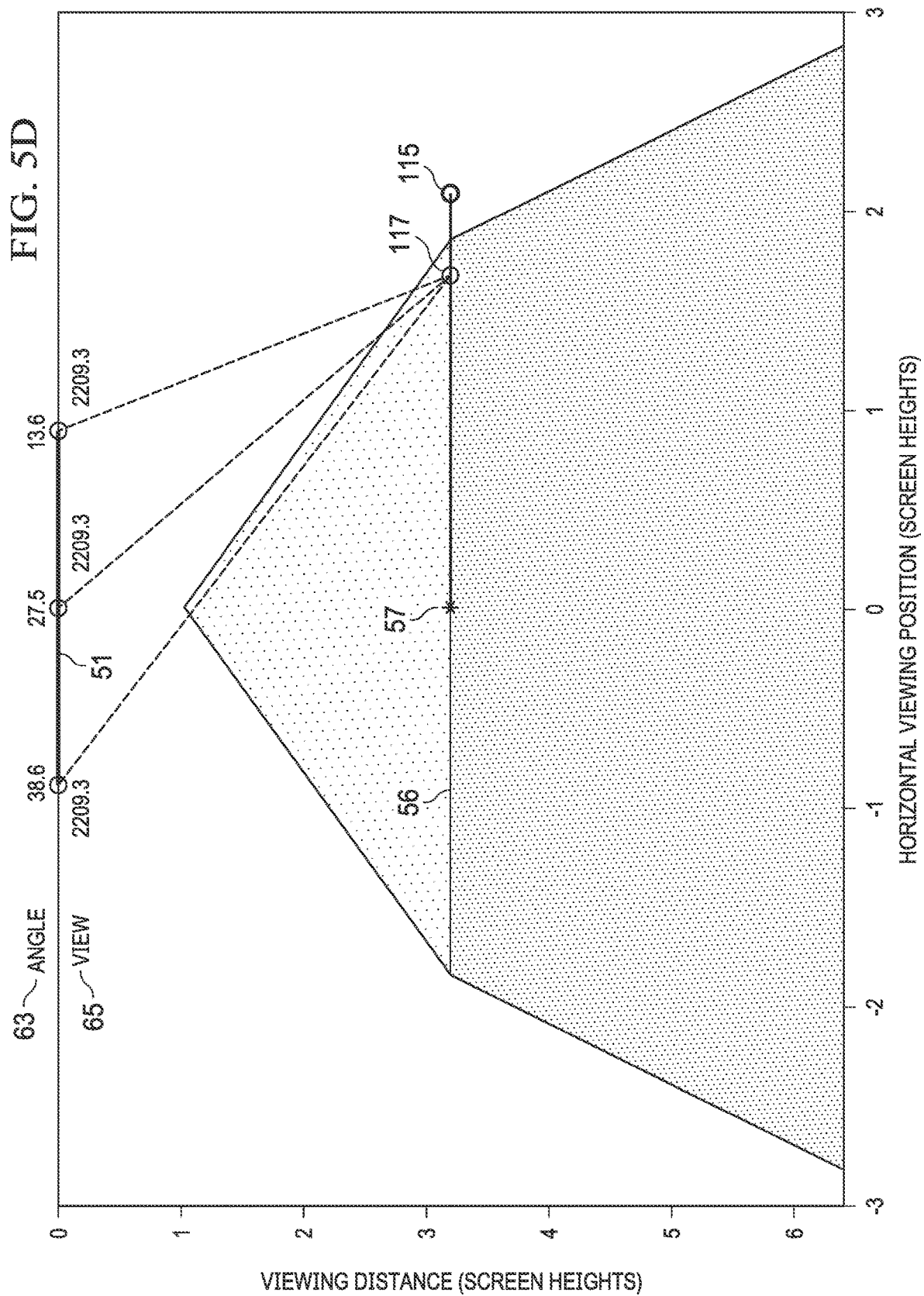

PROCESSING OF EXTENDED DIMENSION LIGHT FIELD IMAGES

CROSS-REFERENCE TO RELATED APPLICATIONS

This application is a U.S. National Stage application under U.S.C. 371 of International Application No. PCT/US2021/061683, filed on 2 Dec. 2021, which claims priority to U.S. Provisional Application No. 63/121,372 and European Patent Application No. 20211870.9, both filed on Dec. 4, 2020, each of which is incorporated by reference in its entirety.

FIELD OF THIS DESCRIPTION

This disclosure relates to the field of image processing, and particularly to image processing of light field images.

BACKGROUND

A recent development in the field of image processing and image display is called light field processing which has the ability to display images, from a previously rendered volumetric content, at different viewpoints in both the horizontal direction and vertical direction. These different directions are different angles from a classic "straight on" viewing position in which a line between the viewer and the display is perpendicular to the surface of the display. This type of image processing and display is now referred to as 4D light field imaging because the imaging can be described as a function of four values, those values being: pixel location (e.g., x,y) in the previously rendered image and the horizontal and vertical angles of the viewpoint. Further background information about 4D light field images is provided in the following articles: *Light Field Image Processing: An Overview*, by Gaochang Wu, et. al., IEEE Journal of Selected Topics in Signal Processing, Vol 11, No. 7, October 2017, pages 926-954; and *Light Field Rendering*, by Marc Levoy and Pat Hanrahan, in Proc. of the 23d Annual Conf. on Computer Graphics and Interactive Techniques, 1996, pages 31-42.

SUMMARY OF THE DESCRIPTION

This disclosure describes methods and apparatuses for the mapping of light fields, such as 4D light fields. In one embodiment, methods, media, and systems process and display light field images using a view function that is based on pixel locations in the image and on the viewer's position (observer's distance Z) from the display. The view function can be an angular view function that specifies different angular views for different pixels in the light field image based on the inputs that can include: the x or y pixel location in the image, the viewer's distance from the display, and the viewer's position relative to the display. In one embodiment, light field metadata, such as angular range metadata and/or angular offset metadata can be used to enhance the processing and display of the image. In one embodiment, color volume mapping metadata can be used to adjust color volume mapping based on the determined angular views; and the color volume mapping metadata can also be adjusted based on angular offset metadata.

In one embodiment, a method can include the following operations: receiving image data represented in a light field format that includes image data for different views, such as different reference views, for each pixel in a plurality of pixels in an image; receiving a selection of a desired viewpoint relative to the image; and determining one or more views at each pixel in the plurality of pixels using a view function that determines the one or more views based on spatial coordinates of each pixel in the plurality of pixels in the image, based on the desired viewpoint, and based on a distance between the desired viewpoint and a display. In one embodiment, the method can include the following additional operations: rendering, based on the determined view, the image; and displaying the rendered image at the determined view. The received and decoded image data in the light field format can be referred to as a baseband light field representation that includes different reference views that can be used to construct additional views based on these different reference views. The baseband light field image format can be represented as either a) a decoded planar format as tiles, each tile being one of the possible views or b) an interleaved format.

In one embodiment, the baseband light field image is a 4D light field image that has been previously rendered as volumetric content, and the selection of the desired viewpoint is received from a user in order to see the image at the desired viewpoint. The view function can be an angular view function that comprises a horizontal angular view function and a vertical angular view function; the horizontal angular view function can have inputs comprising: the distance between the desired viewpoint and the display, a horizontal spatial coordinate for a pixel, and a horizontal component of the desired viewpoint; the vertical angular view function can have inputs comprising: the distance between the desired viewpoint and the display, a vertical spatial coordinate for a pixel, and a vertical component of the desired viewpoint.

In one embodiment, the view function is defined relative to a reference plane at a reference distance from the display such that the view function will determine the same view for all pixels in the image for any one viewpoint in the reference plane. For a viewpoint outside of the reference plane, the view function can determine different views for different pixels in the image. In one embodiment, the desired viewpoint is selected based on an estimated viewer position.

In one embodiment, a method can also include the following additional operations: receiving color volume mapping metadata; and applying color volume mapping based on the determined view and the color volume mapping metadata. In one embodiment, the color volume mapping metadata is adjusted based on the desired viewpoint and angular offset metadata. In one embodiment, the angular offset metadata can be interpolated based on the desired viewpoint. In one embodiment, the color volume mapping metadata can vary over a plurality of different images on a scene by scene basis or an image by image basis.

In one embodiment, a method can also include the following additional operation: interpolating the determined view, at the desired viewpoint, from a set of nearest available reference views in the image data. In one embodiment, the interpolating can use bilinear interpolation from a dense light field image that includes many reference views.

In one embodiment, a method can also include the following additional operation: limiting viewpoints that can be a desired viewpoint to a valid viewing zone. In one embodiment, the limiting can comprise one of (a) hard clamping an invalid viewpoint to a viewpoint in the valid viewing zone or (b) soft clamping the invalid viewpoint to a viewpoint in the valid viewing zone. In one embodiment, a method can also include the additional operation of receiving metadata that includes an angular range that is used to determine the valid viewing zone.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The aspects and embodiments described herein can also include computer products and computer media such as, for example: A computer program product comprising instructions which, when the program is executed by a computer, cause the computer to carry out any of the methods described in this disclosure, including the exemplary embodiments below such as exemplary embodiments 1-15; and A computer-readable [storage] medium comprising instructions which, when executed by a computer, cause the computer to carry out any of the methods described in this disclosure, including the exemplary embodiments below such as exemplary embodiments 1-15.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 3A shows an example of a viewing zone and a reference viewing position for a full High Definition (FHD) image (having a pixel resolution of 1920 by 1080).

FIG. 3B shows another example of a viewing zone and a rightmost view position for a FHD image.

FIG. 3C shows another example of a viewing zone and a closest viewing point for a FHD image.

FIGS. 4A, 4B, 4C, and 4D show examples of different viewing zones for different angular ranges of the light field images.

FIG. 5A shows an example of how an invalid viewpoint or viewing position is converted into a valid viewpoint of a light field image.

FIG. 5B shows another example of how an invalid viewpoint or viewing position is converted into a valid viewpoint of a light field image.

FIG. 5C shows an example of a soft clamping function that can be used to convert an invalid viewpoint into a valid viewpoint.

FIG. 5D shows an example of the use of a soft clamping function to convert an invalid viewpoint into a valid viewpoint.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This disclosure describes methods, non-transitory machine readable media and data processing systems that can map light fields, such as 4D light fields containing reference views, to different viewpoints of the image. This disclosure starts with an overview specific to 4D Light Fields, then describes the process for mapping such a light field for specific viewpoints. Then, further aspects that use interpolation and use metadata are described. It will be appreciated that the embodiments described herein can be combined in various different combinations which are intended to be encompassed by the claims below.

Figure 1:
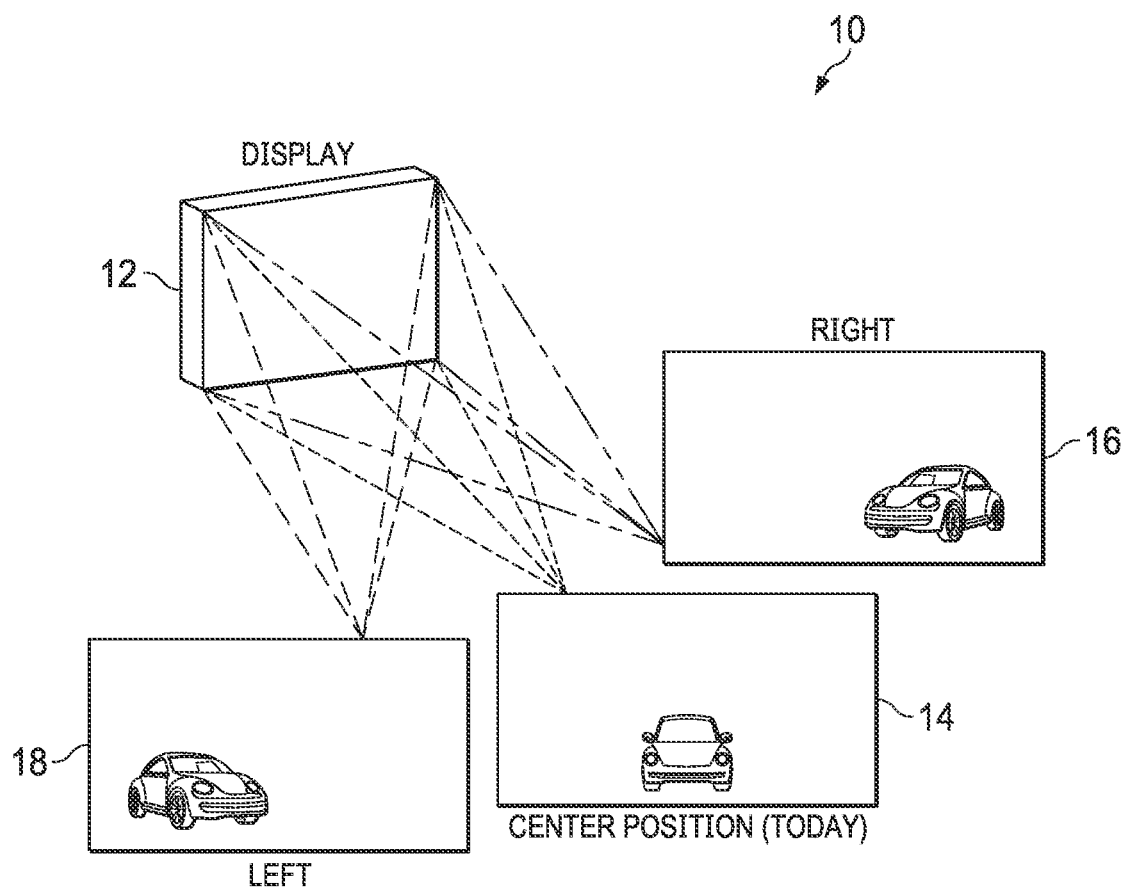
FIG. 1 shows an example of three different views from three different viewing positions or viewpoints of an image such as a 4D light field image.

In one embodiment, a light field, such as a 4D light field, can be a complete representation of a volumetric scene behind a planar surface, such as the planar surface of a display screen of a display device. The display device can display an image of the scene at different viewpoints so that a viewer is presented with a different image depending on their viewing position or viewpoint. The image can be pre-rendered volumetric content that is stored in a 4D light field format. FIG. 1 shows an example of a system 10, according to one embodiment, that displays different images at different viewpoints on a display 12. When the viewer is at the center position, the display 12 shows the image 14 which is the conventional image presented today in systems that do not use light fields. When the viewer moves to the left side of the display, the system displays an image 18 that shows how the scene looks from this viewpoint on the left side of the display 12. When the viewer moves to the right side of the display 12, the display 12 presents an image 16 that shows how the scene looks from this viewpoint on the right side of the display 12.

A 4D light field can allow a viewer to look around within a scene, showing a slightly different perspective from each viewing position, somewhat like looking through a window at a real scene. In one embodiment, a slightly different perspective can show different images which can include specular highlights that show up in only one view and not an adjacent view such as glints off snow, water, metal, skin, eyes, etc. In one embodiment, the light field can include occlusions that are revealed with slight movements of the viewer, within the viewing zone. These occlusions may be at the border of the window or within the scene itself, with some objects partially obscured by closer objects. In one embodiment, the light field can support both optically captured content as well as rendered graphics that have been rendered by a computer or other data processing system. The light field can in effect allow a viewer to move or walk around scene to see different views of the scene by moving to different viewpoints that are valid in the scene. For example, in the case of FIG. 1, the user may be able to walk around at least a portion of the car to see the front of the car and the right side of the car and the left side of the car or at least a portion of the right side of the car and a portion of the left side of the car by changing the viewer's viewpoint.

A light field can be considered to have four dimensions that include pixel location (e.g., x, y) and angle information (u, v); in addition, for each pixel location there will be color information representing the color of the pixel at each of the possible views. Each pixel location can have multiple views (e.g., and hence multiple color values, one for each view) that are selected based upon the angle information; in other words, the color information that is selected at the pixel location depends upon the angle information which is derived from the viewpoint selected by the user or determined by the system (e.g., the system estimates the user's position). A first viewpoint will cause the selection of a first view that causes the selection of a first color information (corresponding to the first view) at a particular pixel and a second viewpoint will cause the selection of a second view that selects a second color information (corresponding to the second view) at the same pixel. A conventional image can be considered to have three dimensions represented by the pixel location (e.g., x, y) and the color information "c" (so the conventional image can be represented by the notation Im(x, y, c)). The additional information of the 4D light field is the angular information (e.g., u, v) that is derived from the selected viewpoint to view the scene, and thus a 4D light field image can be represented by the notation Im(x, y, u, v, c).

A light field can have an angular resolution that can be defined as the number of views (also referred to as number of angular views in some embodiments). In the example shown in FIG. 2, the horizontal angular resolution is 5 (5 distinct views) and the vertical angular resolution is 5 (5 distinct views). A light field can also be defined as having an angular range (e.g., in degrees) that can be defined as the maximum angle both vertically and horizontally. In one embodiment, there is a specified angular range that is supported by the content, and this specified angular range can be determined during capture, creation or rendering of the content and can be stored and transmitted as angular range metadata associated with content, where the angular range can be in units of degrees. In one embodiment, there can be two angular range values, one for the maximum horizontal angle at which the light field can be accurately viewed and the other for the maximum vertical angle at which the light field can be accurately viewed. When the angular range is zero for both horizontal and vertical, there is no alternative view in either direction and the content can only be viewed correctly from what is described herein as the reference viewing position and the single view from this viewing position (the reference viewing position) is the same as the existing content of conventional 2D systems and is the same as the image 14 shown in FIG. 1. Another term that can be used to describe the angular information is angular density, which can be expressed as the ratio of (angular resolution)/(angular range); angular resolution can be in units of views per degree.

Figure 2:
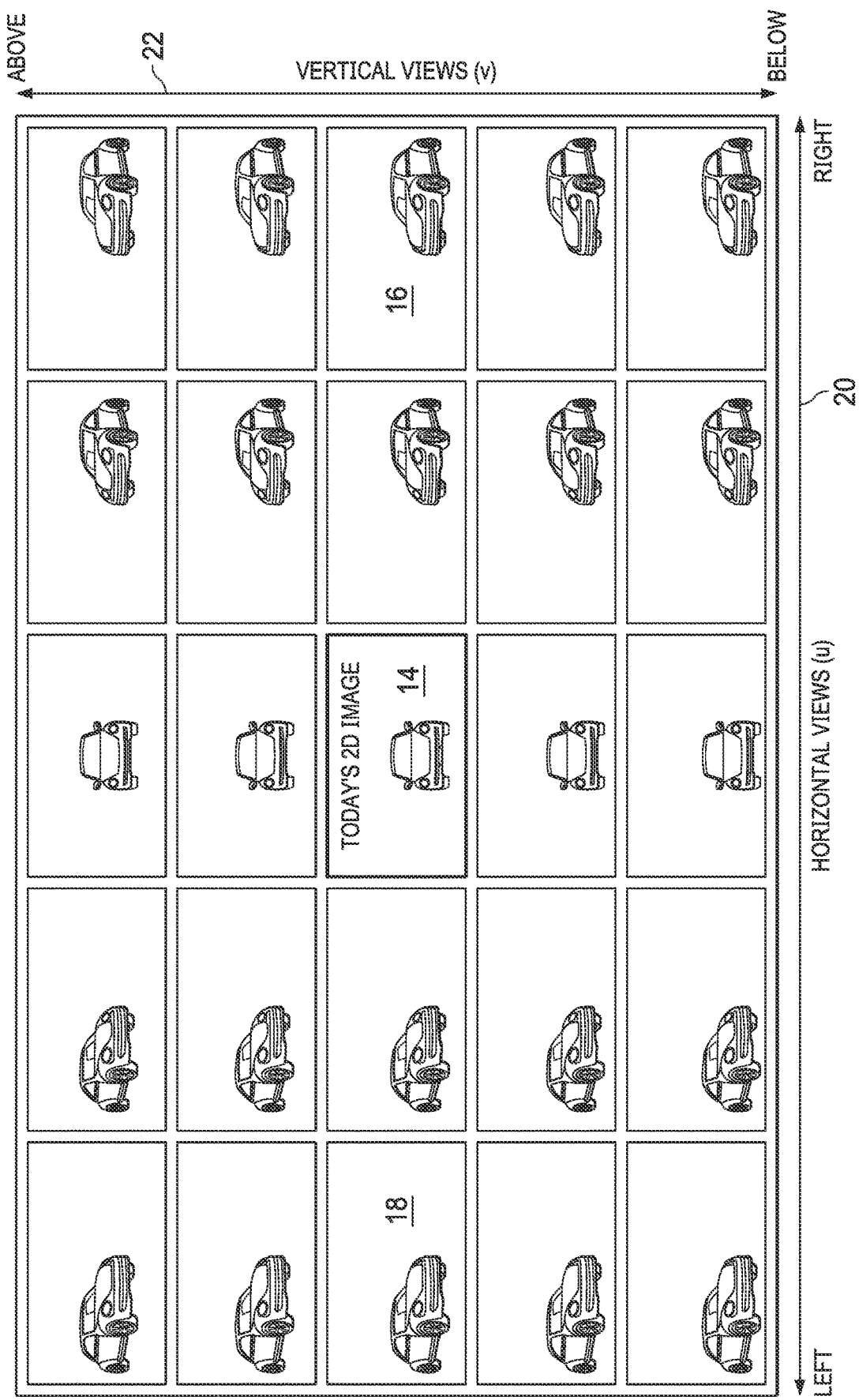
FIG. 2 shows an example of how a 4D light field image can be stored as a set of tiles (referred to as decoded planar format); each tile is one of the possible views of the image, and each view corresponds to a particular viewpoint or viewing position.

A 4D light field image can be conceptualized in two ways: a planar light field image (shown in FIG. 2) and an interleaved light field image. A received and decoded 4D light field image can be referred to as a baseband light field image that contains reference views that can be utilized to create more views based on the reference views. In a planar light field image, such as the 4D light field image shown in FIG. 2, each tile or plane is the image corresponding to a different reference viewing position or viewpoint, and each of these tiles or planes is one of the reference views. The planar 4D light field can be well suited for spatial operations, such as compression and resizing using existing image processing architectures which are described below. In the example shown in FIG. 2, the angular resolution is 5 views by 5 views. The central tile 14 (at for example u=2, v=2) is today's conventional 2D image, which corresponds to the reference viewing position described below. The angular range of this example in FIG. 2 is 30° in both horizontal and vertical directions. The leftmost tile, along the central row of tiles (v=2), corresponds to image 18 in FIG. 1 at the reference viewing distance described below, and the rightmost tile, along the central row of tiles, corresponds to image 16 in FIG. 1 at the reference viewing distance described below. Other tiles in FIG. 2 correspond to different viewing positions at different horizontal angles 20 and vertical angles 22 at the reference viewing distance described below. For example, the tile in the upper left corner shown in FIG. 2 corresponds to a horizontal view at the leftmost viewpoint and a vertical view at the highest viewpoint in the vertical direction; the tile in the upper right corner shown in FIG. 2 corresponds to a horizontal view at the rightmost viewpoint and a vertical view at the highest viewpoint in the vertical direction. The tile in the lower left corner shown in FIG. 2 corresponds to a horizontal view at the leftmost viewpoint and a vertical view at the lowest viewpoint in the vertical direction; the tile in the lower right corner shown in FIG. 2 corresponds to a horizontal view at the rightmost viewpoint in a vertical view at the lowest viewpoint in the vertical direction. The horizontal views for pixels along the top row of tiles, from left to right of this representation in FIG. 2, are (a) for the first tile (upper left corner tile): $x_0u_0$, $x_1u_0$, $x_2u_0$, $x_3u_0$, . . . (b) for the next tile (to the right of the first tile): $x_0u_1$, $x_1u_1$, $x_2u_1$, . . . . The vertical views for pixels along the top row of tiles, from left to right of this representation in FIG. 2, are (a) for the first tile (upper left corner tile): $y_0u_0$, $y_1u_0$, $y_2u_0$, $y_3u_0$, . . . (b) for the next tile (to the right of the first tile): $y_0u_1$, $y_1u_1$, $y_2u_1$, . . . . Thus, at the reference viewing distance described below all pixels in the tile in the upper left corner will have the view shown in the upper left corner tile in FIG. 2, and all pixels in the next tile (along the top row of tiles) will have the view shown in that next tile in FIG. 2.

It is also possible to represent the 4D Light Field as an interleaved image. In this representation, the angular views are interleaved horizontally and vertically, so that adjacent pixels correspond to different view directions. This representation can facilitate angular processing, such as interpolation between viewpoints, since only a small contiguous region of the 4D Light Field image is required to select or interpolate a new viewpoint (discussed later). The views of the pixels along the top row, from left to right, of this representation yields $X_0U_0$, $X_0U_1$, $X_0U_2$, $X_0U_3$, $X_0U_4$, $X_1U_0$, $X_1U_1$, . . . .

The planar 4D light field shares some similarities with a planar color representation of an image, where each dimension of the color is represented as a complete image (e.g., R, R, R, G, G, G, B, B, B). As an alternative, color images can also be represented in an interleaved fashion (e.g., R, G, B, R, G, B, R, G, B). Likewise, an interleaved 4D light field represents each view interleaved with the others. It is possible to convert between planar and interleaved formats losslessly and efficiently by indexing into the appropriate portions of the system memory that is storing the light field image.

In this disclosure, many illustrations and methods focus on only the horizontal axis (x,u) for clarity. It will be appreciated that the same approaches are also applicable for the vertical axis (y,v) even when not explicitly stated.

Viewing Zone and Reference Viewing Position

The viewing zone can be defined as the region in which valid viewpoints can be rendered. In one embodiment, this viewing zone can be used to constrain views as described further below. A valid viewing zone is a viewing zone of an image that is constrained and defined by an angular range metadata for the image, and the angular range metadata (described further below) specifies a range of angles over which the image can be viewed. A valid viewpoint is any viewpoint in the valid viewing zone; an invalid viewpoint is a viewpoint outside of the valid viewing zone. This viewing zone can be divided into two regions 59 and 61 shown in FIGS. 3A, 3B and 3C which show a top-down view 50 in the horizontal direction of a display 51 and the viewing zone that includes regions 59 and 61. In the example shown in FIGS. 3A, 3B, and 3C, the valid viewing zone is constrained to regions 59 and 61. The region 61 shows the viewing zone where the 4D light field can be accurately viewed at or beyond the visual acuity of a normal observer, and this region 61 is beyond the reference viewing distance defined by the reference view plane 56; in other words, the region 61 has an observer/viewer distance from the display 51 that is greater than the distance (shown on the y axis 53) between the reference viewing plane 56 and the display 51. The region 59 shows the viewing zone where the 4D Light Field can still be accurately viewed, but the observer may observe individual pixels due to limited spatial resolution (because the viewer is closer to the display 51 than the reference viewing plane 56). The viewing zone is determined by the angular range and the spatial resolution, explained in more detail below. The reference viewing plane 56 separates regions 59 and 61 and includes a reference viewpoint position 57 at the center of the reference viewing plane 56. Positions along the x axis 55 can be a position of a viewer (in the horizontal direction). It will be appreciated that a representation of the viewing zone in the vertical direction will be similar to what is shown in FIGS. 3A, 3B and 3C.

The reference viewpoint position 57 at the center of the reference viewing plane 56 can be defined to be in the center of the screen (horizontally and vertically) and at a reference distance z0 where the spatial resolution of the screen is 60.8 pixels per degree. For a full high definition (FHD) resolution image (e.g., a 1920*1080 image) this reference distance z0 is 3.2 picture heights (so the distance between the reference plane 56 and the display 51 is 3.2 picture heights); as shown in FIGS. 3A, 3B, etc., the reference plane and the plane of the display's surface are parallel to each other. This reference distance z0 separates the viewing zones 59 and 61, and the reference viewing plane 56 is located at a distance of z0 from the display 51. At greater distances, visual acuity is less than the screen resolution, and an image can be presented with high visual fidelity. At closer distances, visual acuity is greater than the screen resolution, and the individual pixels comprising an image may be visible. The reference viewing distance (z0, in units of screen heights), can be calculated from the vertical spatial resolution of the panel in the vertical dimension (i.e. Y=1080, or 2160, or 4320, for example) by the equation: z0=0.5/tan(Y/(2*60.8)).

Also shown in FIG. 3A, there are three angles, positioned horizontally across the display at the left-most edge, the center, and the right-most edge. These illustrate the angle formed by the normal to the screen and the viewing position. These angles are computed with thetafun (in units of degrees) from the pixel position (x,y, in units of screen heights), the observer position (ObX, ObY, in units of screen heights)), and the reference viewing distance (z0, in units of screen heights), as described below:

thetafunu=atan((*ObX-x*)/(*z*0+0*bZ*));

thetafunv=atan((*ObY-y*)/(*z*0+0*bZ*));

At the reference viewing position, these angles (shown in angle 63 alongside display 15) are −15.5 degrees, 0 degrees, and 15.5 degrees respectively, assuming an image with a 16:9 aspect ratio. Also shown are three horizontal view 65 indices, that indicate which angular view to present to the viewer. The angular view is calculated by a horizontal view function: u=ufun(x, ObX, ObZ) and a vertical view function v=vfun(y, ObY, ObZ), where (u,v) are the angular views, (x,y) are the spatial coordinates of each pixel in the image, and ObX, ObY, ObZ are the locations of the observer with respect to the reference position (where they are all zero). The angular view functions are described in more detail later. At the reference viewing position 57, the horizontal view function ufun is defined, in one embodiment, so that at ufun(x, 0, 0)=0, or in other words, the horizontal angular view=0 at the reference position for all pixels, as shown in FIG. 3A. At the reference viewing position 57, the vertical view function vfun is defined, in one embodiment, so that at vfun(y, 0, 0)=0, or in other words, the vertical angular view=0 at the reference position for all pixels, as shown in FIG. 3A.

Viewing Positions at Reference Viewing Plane and Rightmost Viewing Position

The viewing positions along the line at z0 are referred to as the viewing positions in the reference viewing plane 56. As the viewer moves laterally along this line in the reference viewing plane 56 (at constant Z distance relative to the display 51), they are presented with new views of the scene from the 4D Light Field. All pixels in the image, when the viewpoint is on the reference view plane, will have the same view at that viewpoint in one embodiment. FIG. 3B illustrates one viewpoint that lies on the reference viewing plane, referred to as the rightmost viewing point 67. This is defined to be the point at the angular range of the content from the center of the image.

As shown in FIG. 3B, the angle between the screen normal and the rightmost viewing point is 30 degrees at the center of the screen, which is the angular range in this example. Also shown in FIG. 3B, the angles between the screen normal and the rightmost viewing point are all different, ranging from 40.5 degrees for the left-most pixel on the image, to 16.7 degrees for the right-most. However, the angular view is defined earlier to be the same for all positions at the viewing plane. This is done by further defining the view functions ufun(x, ObX, 0)=un, and vfun(y, ObY, 0)=vn. In other words, the same view (un, vn) is calculated for all pixels (x,y) at any one given possible observer location (ObX, ObY) along the reference plane (ObZ=0) at a particular viewpoint in the plane 56. As shown in FIG. 3B, this is satisfied since the horizontal view=2 (shown by view 65 notations just below display 51 in FIG. 3B) for each spatial position (x,y) in the image. The rightmost viewing position (ObXmax, in units of screen heights) is determined from the reference viewing distance (z0, in units of screen heights) and the viewing angle range (AngleRange, in units of degrees). This returns the view corresponding to the maximum angular range Umax. For example: ObXmax=−z0/tan(AngleRange+90).

Closest Viewing Position

FIG. 3C shows an additional viewpoint of interest, called the Closest Viewing Position. This is defined as the closest point within the viewing zone. As can be seen, the angle formed between the screen normal and the Closest Viewing Point is degrees for the left-most pixel in the image, the same as it is for the Rightmost Viewing Point. The angle between the screen normal and the Closest Viewing Point is zero and −40.5 degrees for the center pixel and right-most pixels respectively. These angular views that these correspond to are labeled as well (see view 65), and are −2, 0, and 2, respectively (−Umax, 0, Umax). This means that the appropriate image for the closest viewing position is composed from multiple views from the 4D Light Field. The left-most pixel comes from the right-most view (Umax=2), the center pixel comes from the center view (u=0), and the right-most pixel comes from the left-most view (−Umax=−2). Pixels in between come from intermediate views, or are interpolated, which is discussed later. Note that the view from any viewing position that is not on the Reference Viewing Plane is also composed from multiple views from the 4D Light Field in a similar way. In other words, in one embodiment, if the viewpoint is not on the reference viewing plane 56, then multiple views will be used for pixels in the image, with different pixels in different spatial locations using different views.

The closest viewing point (ObZmin, in units of screen heights) is calculated from the aspect ratio (ar), rightmost viewing position (ObXmax, in units of screen heights) and the reference viewing distance (z0, in units of screen heights): ObZmin=z0/(1+2*ObXmax/ar)−z0.

Furthest Viewing Position

The furthest viewing position ObZmax (in units of screen heights) is the furthest distance where the 4D Light Field may be perceived correctly. This is calculated, in one embodiment, from the aspect ratio (ar), rightmost viewing position (ObXmax, in units of screen heights) and the reference viewing distance (z0, in units of screen heights):

```
if ObXmax<ar/2
    ObZmax  = z0 / (1 − 2*ObXmax/ar ) − z0;
else
    ObZmax  = z0*2 − z0;
end
```

For viewing zones where the rightmost distance is equal or greater than the width of the screen, the furthest viewing position ObZmax is infinity, or in fixed point representation the largest distance that can be represented.

Effect of Angular Range on Viewing Range

The angular range corresponds to the maximum angle from the center of the screen to the rightmost viewing position. FIGS. 4A, 4B, 4C, 4D show examples comparing the angular range of 0, 5, 15.5, and 30 degrees respectively, as well as the rightmost viewing position for each of these examples.

At zero degrees angular range shown in FIG. 4A, the viewing zone is only a single point, corresponding to the reference viewpoint. This is the case for today's 2D images, where the images are produced to be viewed with correct perspective from a single viewing position. At any other viewing position outside of the viewing zone, the perspective becomes incorrect, and the human visual system infers that the image lies on a 2D plane, rather than being a real scene "behind" a 2D plane. When U=1 and V=1, the angular resolution must be zero, and the 4D Light Field collapses to be identical to a conventional 2D image.

At 5 degrees angular range shown in FIG. 4B, the viewing zone (which includes regions 59A and 61A) increases slightly to a diamond shape. Within this viewing zone, the viewpoint may move slightly and an image with correct perspective be calculated and shown, thus mimicking the experience of looking through a window. The rightmost viewpoint 71 on the reference viewing plane 56 will provide the same view (view 2) for all pixels in the image.

With 15.5 degrees angular range shown in FIG. 4C, the viewing zone matches the size of the image (the rightmost viewing position 73 corresponds to the width of the image), and can be viewed with correct perspective from any distance away. The viewing zone (which includes regions 59B and 61B) increases with increasing angular range. With 30 degrees angular range shown in FIG. 4D, the viewing zone (which includes regions 59C and 61C) is larger than the image in most locations of the viewing zone; the rightmost viewing position 75 is beyond the rightmost pixel on the display 51.

Angular View Functions

The horizontal and vertical view functions can be used to compute the angular view for a given viewing position: u=ufun(x, ObX, ObZ) and v=vfun(y, ObY, ObZ), where u,v are the angular views, x,y are the spatial coordinates of each pixel in the image, and ObX, ObY, ObZ are the locations of the observer with respect to the reference position (where they are all zero).

The following constraints on the angular view functions can be further specified to ensure that each view of the planar 4D Light Field images correspond to images with correct perspective on the reference viewing plane. With these constraints, the views for all viewpoints on the reference plane can each be constructed and these views can be used as reference views to construct views for viewpoints outside of the reference viewing plane.

Reference Viewing Point ufun(x, 0, 0)=0 (u=0 for all pixels in the image x)
    vfun(y, 0, 0)=0 (v=0 for all pixels in the image y)

Reference Viewing Plane ufun(x, ObX, 0)=$U_n$ (u=$u_n$ for all pixels in the image x)
    vfun(y, ObY, 0)=$U_n$ (v=$v_n$ for all pixels in the image y)

Outmost Viewing Point ufun(x, ObX max, 0)=Umax (u=Umax for all pixels in the image x) vfun(y, ObY max, 0)=Vmax (v=Vmax for all pixels in the image y)

In one embodiment, the following view functions satisfy the above criteria:

ufun(x, ObX, ObZ)=(thetafunu(x, ObX, ObZ)+(thetafunu(0, (ObX-x)*z0/(z0+ObZ)+x, 0)−thetafunu(x, (ObX-x)*z0/(z0+ObZ)+x, 0)))*Umax/AngularRangeU;

vfun(y, ObY, ObZ)=(thetafunv(y, ObY, ObZ)+(thetafunv(0, (ObY-y)*z0/(z0+ObZ)+y, 0)−thetafunv(y, (ObY-y)*z0/(z0+ObZ)+y, 0)))*Vmax/AngularRangeV;

This simplifies, in one embodiment, to the following set of horizontal and vertical view functions:

ufun(x, ObX, ObZ)=atan((ObX-x)/(ObZ+z0)+x/z0)*Umax/AngularRangeU vfun(y, ObY, ObZ)=atan((ObY-y)/(ObZ+z0)+y/z0)*Vmax/AngularRangeV. In this example of these view functions, AngularRangeU is the horizontal angular range that can be specified by angular range metadata for the image, and AngularRangeV is the vertical angular range that can be specified by angular range metadata for the image; also in this example, Umax is the horizontal angular resolution of the image, and Vmax is the vertical angular resolution of the image. Umax and Vmax can also be specified in metadata for the image.

Interpolating Angular Views and Dense 4D Light Fields

For many viewing positions (especially viewpoints outside of the reference viewing plane), the angular view functions may return fractional values. This means that the required view lies somewhere between adjacent views, thus the correct view for such viewing positions must be interpolated from existing views, such the tiles or views shown in FIG. 2. The process of creating an image by interpolating between 2 or more images is known in the art; however, in order to perform such interpolation, it is desirable to have a light field image that has a high angular density, referred to in this disclosure as a dense 4D light field image. A dense 4D light field is defined to have a sufficiently high angular density that the differences between adjacent views are imperceptible, or just barely perceptible to the eye at the reference viewing plane. This occurs when a lateral shift of viewpoint (ObXmin=ar/X) of the same size as a single pixel size of the image increments the angular view by close to 1.0. This occurs at the reference viewing position when:

AngularDensity=1/atan(ar/X, z0)

With the angular density defined above, the same lateral shift ObXmin near the rightmost viewing position may not yield an angular view increment of exactly 1.0, so it may be preferred to calculate the angular density for this worst-case viewing position:

A1=atan(ObXmax/z0)
A2=atan((ObXmax−ObXmin)/z0)
AngularDensity=1/(A2−A1)

At viewing distances greater than the reference plane, the same lateral shift of ObXmin may yield an angular view increment of less than 1.0. However, this is expected as the visual acuity of the observers decreases at greater viewing angles.

The simplest form of angular view interpolation is nearest neighbor, where the interpolated view (IV) is calculated according: IV=4DLF(x, y, floor(ufun(x, ObX, ObZ)+0.5), floor(vfun(y, ObY, ObZ)+0.5)) With a dense 4D light field of with sufficiently high angular resolution this interpolation may yield a smooth visual experience with changing viewpoints.

A better (smoother) approach in one embodiment is to use bilinear interpolation, where the nearest two, three, or more angular views are added based on the linear distance to each view. With bilinear interpolation the horizontal views can be interpolated first, followed by the vertical views, or the other way around. An example of bilinear interpolation using two views is:

IV1=4DLF(x, y, floor(ufun(x, ObX, ObZ)), floor(vfun(y, ObY, ObZ)))
IV2=4DLF(x, y, floor(ufun(x, ObX, ObZ)+1), floor(vfun(y, ObY, ObZ)))
IV3=4DLF(x, y, floor(ufun(x, ObX, ObZ)), floor(vfun(y, ObY, ObZ)+1))
IV4=4DLF(x, y, floor(ufun(x, ObX, ObZ)+1), floor(vfun(y, ObY, ObZ)+1))
AlphaU=ufun(x, ObX, ObZ)−floor(ufun(x, ObX, ObZ))
AlphaV=vfun(y, ObY, ObZ)−floor(vfun(y, ObY, ObZ))
IVU1=IV1*(1-AlphaU)+IV2*AlphaU
IVU2=IV3*(1-AlphaU)+IV4*AlphaU
IV=IVU1*(1-AlphaV)+IVU2*AlphaV With a dense 4D light field of sufficiently high angular resolution, this interpolation may yield a smoother visual experience with changing viewpoints. Using three or more views to the bilinear interpolation may result in a more consistent sharpness between multiple viewpoints, as some level of interpolation or combination of viewpoints is always being applied.

The interleaved 4D Light Field can be useful in some embodiments when interpolating between views, as for each spatial position x,y the nearest angular views (u,v) are stored in adjacent memory locations, thus making retrieval efficient. For example, when interpolating between three adjacent views, the layout of the data in memory can allow a system to read a sequence of consecutive address locations for the three views from memory to obtain the data needed to perform the interpolation.

More advanced forms of interpolation are also possible and may be useful in some embodiments for non-dense (or sparse) 4D light fields. One such interpolation, which is known in the art for use in interpolating frame rates, is the family of motion-estimation-motion-compensation techniques. These attempt to align features between adjacent views and then create interpolated views by shifting or morphing the adjacent views. Such techniques are known in the art and are used by services such as IntelTrueView. These techniques can be used with the embodiments described herein to interpolate between views to obtain interpolated pixel color data.

Further improvements to the interpolation may also be possible by considering 4D light field videos, comprising multiple 4D light field images separated by some time t such as a time based on a frame rate of 30 frames per second or other frame rates.

Constraining Angular Views to a Valid Viewing Range

For viewing positions outside of the valid viewing range, the angular view functions may return angular views that are beyond the range included in the image (e.g., Umax, −Umax). This can be addressed in one or more embodiments by constraining the observer positions ObX, ObY, and ObZ to the valid viewing range, before determining the angular view. In one embodiment, the view (within the valid viewing range) that is closest to the observer position is selected as the one that is rendered, to prevent a sudden change in angular views as an observer crosses the boundary between the valid viewing zone and outside the zone.

The angular view can be constrained as illustrated in FIGS. 5A and 5B. Referring now to FIG. 5A, the actual viewer position 91 (ObX, ObY, ObZ) is outside of the valid viewing zone that includes regions 59D and 61D, and this actual viewer position 91 is constrained to be within the valid viewing zone by selecting the constrained viewpoint 93 (ObXc, ObYc, ObZc) and using that constrained viewpoint 93 to determine the view to be provided. In the case of FIG. 5B, the actual viewer position 95 is outside of the valid viewing zone (and in front of the closest viewing position) and this actual viewer position 95 is constrained to be within the valid viewing zone by selecting the constrained viewpoint 97 (ObXc, ObYc, ObZc) and using that constrained viewpoint 97 to determine the view to be provided. Within the valid viewing range, the intended perspective is rendered ensuring that the perspective shifts with viewer position in a natural way, and that outside the viewing zone the angular view is the closest available view that is within the valid viewing range. This approach works, in one embodiment, by finding the intersection of the line formed between the observer position 91 (at ObX, ObY, ObZ) and the reference viewing position 57 and the line formed by the border of the valid viewing region. This intersection is shown in FIG. 5A at the constrained viewpoint 93, and is shown in FIG. 5B at the constrained viewpoint 97. This intersection is calculated, in one embodiment, in two steps.

The first step determines the point on the border of the valid viewing zone closest that lies on a line between the observer and the reference viewing position:

```
if ObZ>0 && ObXmax <= ar/2
   ObXc = sign(ObX) * ObZmax / ( ObZmax/ObXmax + ObZ/abs(ObX));
     if abs(ObX)>0
       ObZc = ObZ/ObX * ObXc;
     else
       ObZc = ObZmax;
     end
   elseif ObZ>0 && ObXmax > ar/2
     ObXc = 2 * ObX * ObXmax * z0 / (ObZ*ar –
2*ObZ*ObXmax+2*abs(ObX)*z0);
     if ObXc/ObX < 0
       ObXc = ObX;
       ObZc = ObZ*2;
     elseif abs(ObX)>0
       ObZc = ObZ/ObX * ObXc;
     else
       ObZc = ObZ*2;
     end
   elseif ObZ<=0
     ObXc = sign(ObX) * ObZmin / ( ObZmin/ObXmax +
ObZ/abs(ObX));
     if abs(ObX)>0
       ObZc = ObZ/ObX * ObXc;
     else
       ObZc = ObZmin;
     end
end
```

The second step limits the observer position to within the valid viewing range and creates the constrained viewing position (also referred to as constrained viewpoint).

ObXc=sign(*ObX*)*min(abs(*ObX*),abs(ObXc));

ObZc=sign(*ObZ*)*min(abs(*ObZ*),abs(ObZc)).

In an alternate embodiment, the viewing position can be further modified to achieve a soft clamping to the border of the valid viewing range. This is accomplished, in one embodiment, by smoothly "compressing" the viewing positions within the valid viewing zone towards the reference position. As an observer moves away from the reference viewing position, the viewpoint changes less and less as they approach the border of the reference viewing position. This results in a less natural experience compared to looking through a window, but avoids an abrupt transition at the edge of the valid viewing zone and also increases the size of the zone where a different perspective can be observed based on the viewing position.

The operations in one embodiment for applying the soft clamping are:
1) Determine the border of the valid viewing zone that is closer to the observer than any other border of the valid viewing zone and determine the point on that border of the valid viewing zone that lies on a line between the observer and the reference viewing position (same as before, but without the second clamping stage)
2) Compress the angular views in the region near the valid viewing range towards the reference position, as described below:
   a. Determine the distance from the reference viewing position to the observer $R0 = \text{sqrt}(ObX^2 + ObZ^2)$;

b. Determine the distance from the reference viewing position to the edge of the valid viewing zone $RV = \text{sqrt}(ObXc^2 + ObZc^2)$;

c. Determine the ratio of the observer to the edge of the valid viewing zone $R0 = R0/RV$;
   d. Define soft mapping cutoffs $c1$ and $c2$. These are the relative distances between the observer and the valid viewing range where the mapping is linear (less than $c1$), compression region ($c1$ to $c2$), and at the border of the valid viewing zone (beyond $c2$). These can be defined in a configuration file or alternately transmitted by metadata for a certain piece of content.

$c1 = 0.5$;

$c2 = 2$;

e. Calculate the coefficients for the cubic spline compression region. These are calculated so that the slope of the functions is 1 at $c1$, and 0 at $c2$.

$d1 = (c1+c2-2)/(c2-c1)^3$;

$d2 = -(c1+2*c2-3)/(c2-c1)^2$;

Apply the soft clamping

```
if R0>0
   R = R0;
   if R0>=c2
     R = 1;
   elseif R0>c1
     R = (d1*(R-c1)^3 + d2*(R-c1)^2 + (R-c1) + c1);
   end
   ObXc = ObX * R/R0;
   ObZc = ObZ * R/R0;
else
   ObXc = 0;
   ObZc = 0;
end
```

The function described above uses a cubic spline as the soft compression function, as illustrated in FIG. 5C. Other functions that have a similar shape can also be used instead. The dashed black line in FIG. 5C represents the clamping approach (without soft clamping) described above. The curve 103 shows the soft-clamping function. The points 107 and 108 show the c1 and c2 positions respectively, and the point 105 shows how the observer position outside the valid viewing range is mapped to a different viewpoint within the valid viewing range. FIG. 5D shows an example of the use of soft clamping to clamp a viewpoint 115 outside of the valid viewing range to a viewpoint 117 within the valid viewing range; note how the viewpoint 117 is not at the edge of the valid viewing range, but rather is displaced from the edge by a short distance.

Color Volume Mapping

Once the correct angular view has been obtained, it may also be desirable to perform color volume mapping to map the dynamic range of the light field image into the capabilities of the display for the selected angular view. This can be done using techniques used in Dolby Vision such as a Color Volume Mapping process. This process, as described in various existing Dolby patents (e.g., see U.S. Pat. No. 10,600,166), can use metadata to guide the mapping process. This metadata can be based upon the image or sets of images, such as a set of images in a scene that share the same overall color balance and color range and dynamic range. The metadata can vary from scene to scene or even from image to image depending on the level of control desired to render images as accurately as possible. The different scenes can have different amounts of dynamic range and also different color balance and color range, and thus the metadata can vary based on these different scenes. Similarly, the different views in the same light field image can also have different amounts of dynamic range and also different color balance and color range. In one embodiment, a set of color volume mapping (CVM) metadata can be provided for a light field image, and this CVM metadata can be adjusted based on the selected view rather than providing separate CVM metadata for each of the different possible views.

When applying the color volume mapping to the view rendered from a 4D Light Field Image, an embodiment can use a process that is similar to the Dolby Vision processes referred to above. In one embodiment, additional metadata fields may be included with a 4D Light Field that allow the mapping to be adjusted based on the viewing position. For example, from the reference viewing position the image shown on the display may be dark. However, as the observer moves to the rightmost viewing position a bright object such as a window or a light source may be revealed, thus changing the characteristics of the image and hence the optimal color volume mapping. This works in a similar way to human vision, where if you look towards a window the image on the retina will be brighter, causing the visual system to adjust the exposure (also known as adaptation).

In one embodiment, metadata (such as CVM metadata) included with a 4D Light Field may be adjusted based on the angular view functions, by the following steps:

1) Load metadata corresponding to the reference viewing position
2) Load angular offset metadata corresponding to at least one additional viewing position. In an example this includes nine offsets to the offset metadata related to the average luminance in a frame corresponding to the extreme viewing angles (u=−Umax, 0, Umax and v=−Vmax, 0, Vmax). For example, the angular offset metadata may have the values that indicate that from the right-most viewing position the average image brightness is brighter by 0.1 from the reference viewing position (corresponding to the bright window mentioned earlier). The resolution of the angular offset metadata may match the angular resolution of the 4D Light Field image, or it may be less. The angular range of the angular offset metadata should match the angular range of the 4D Light Field Image, so that the right-most offset metadata is paired with the right-most angular viewing position. The nine offsets in this example can be:

[0 0 0.1]
[0 0 0.1]
[0 0 0.1]

3) Interpolate the angular offset metadata based on the angular view. This uses the same ufun and vfun calculations described earlier, to determine modified angular offset metadata. The angular offset metadata can then be averaged to calculate a single value of offset metadata to be applied to the entire frame. Alternately, the angular offset metadata can be calculated for different spatial regions of the image, and used to change the color volume mapping spatially across the image.
4) The interpolated angular offset metadata is then added to the metadata corresponding to the reference viewing position to determine a final metadata value.
5) The color volume mapping is applied using the final metadata values.

This example described the process for adjusting only a single metadata field—the offset metadata related to average luminance in a frame. However, it can also be applied to other metadata fields as well.

Exemplary Methods and Implementation Considerations

Figure 6A:
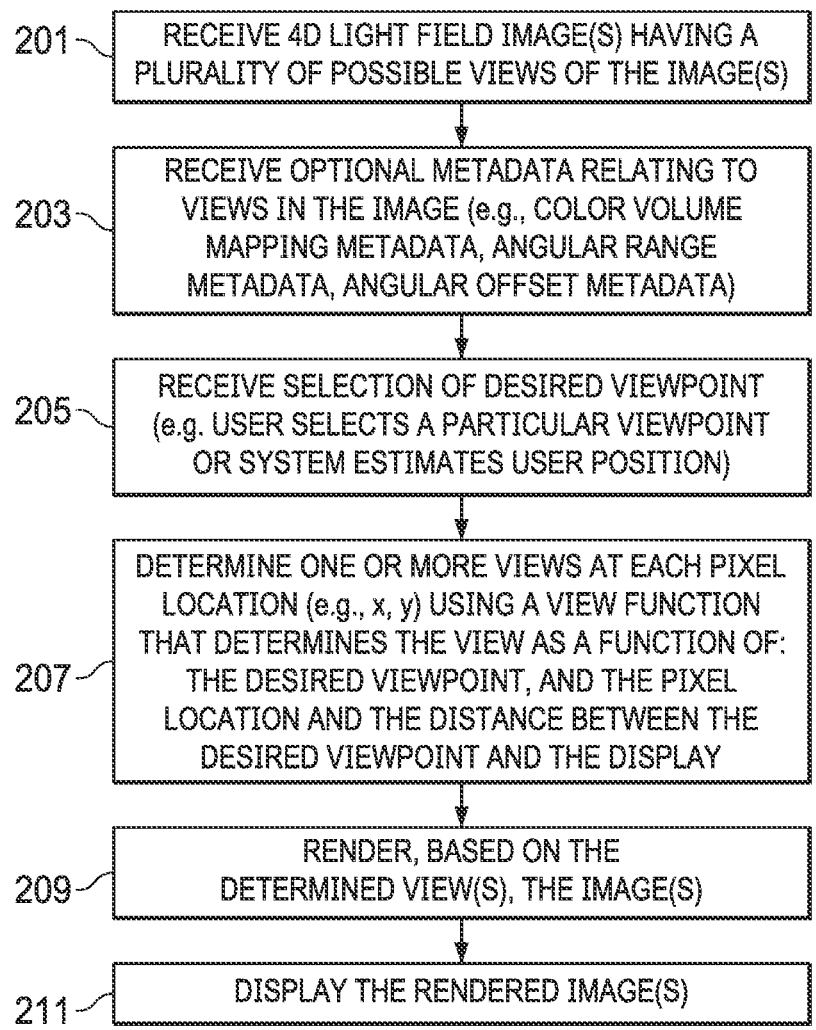
FIG. 6A shows a flowchart that illustrates a method according to one embodiment.
Figure 6B:
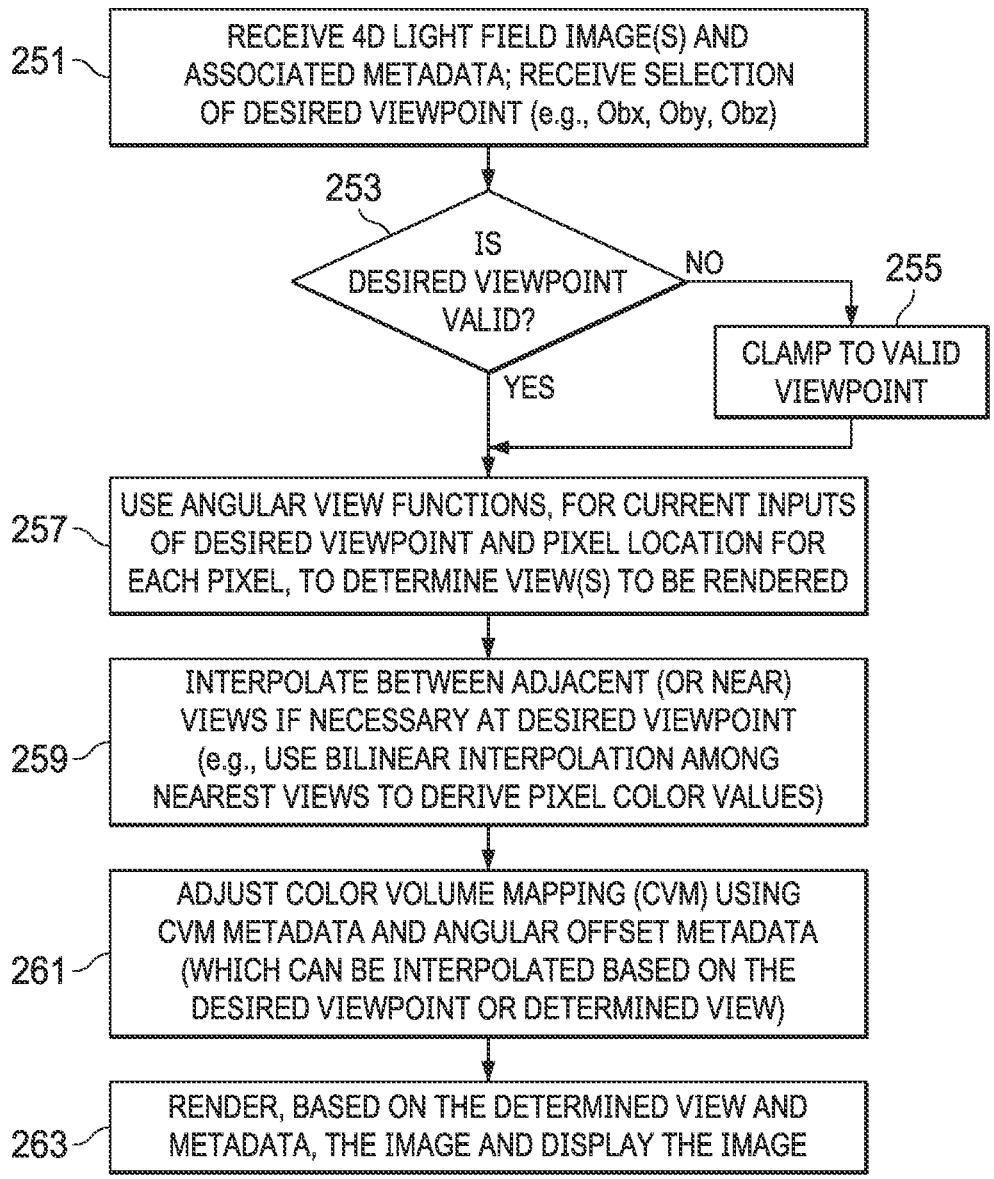
FIG. 6B depicts a flowchart that illustrates a method according to another embodiment.

Two examples of methods using one or more embodiments described herein will now be provided while referring to FIGS. 6A and 6B. The method shown in FIG. 6A can begin in operation 201. In operation 201, a data processing system can receive a light field image, such as a 4D light field image, having a plurality of possible views of an image. In one embodiment, the data processing system can receive a sequence of light field images, such as in animated content or a movie. The data processing system can also receive in operation 203 optional metadata relating to the views in the image; this optional metadata can include color volume mapping metadata, angular range metadata and angular offset metadata. As described above, the angular offset metadata can be used to adjust the color volume mapping metadata that is used to perform color volume mapping that is dependent upon the particular view selected. In operation 205, the data processing system can receive a selection of a desired viewpoint. For example, the user may select a particular viewpoint using a user interface provided by the data processing system; alternatively, the data processing system can determine the desired viewpoint based upon an estimate of the user's position in an environment that surrounds the light field image. Then in operation 207, the data processing system can determine one or more views at each pixel location using a view function that determines the view as a function of: the desired viewpoint, and the pixel location and the distance between the desired viewpoint and the display. Then in operation 209, the data processing system can render, based upon the view that was determined in operation 207, the image. When multiple light field images are being received, each one can have a desired viewpoint which in turn is used to determine a view based upon the view function. In operation 211, the data processing system can then display the rendered images.

In the method shown in FIG. 6B, a data processing system can, in operation 251, receive one or more light field images and associated metadata; the data processing system can also receive a selection of a desired viewpoint which may be a user's selection or a selection performed by the data processing system based upon, for example, the user's estimated position. Then in operation 253, the data processing system determines whether the desired viewpoint is a valid viewpoint based upon the valid viewing range of the particular light field image. For example, the data processing system can determine that the viewpoint is outside of the valid viewing range, in which case the data processing system performs operation 255 to clamp the desired viewpoint to a valid viewpoint using one or more of the embodiments described herein. If operation 253 determines that the viewpoint is valid or operation 255 creates a valid viewpoint, then processing can proceed to operation 257. In operation 257, the data processing system can use the angular view functions described herein for the current inputs of the desired viewpoint (which may be a constrained viewpoint) to determine views to be rendered for each pixel location in the image. In certain cases, the views determined by the view functions can be interpolated from existing views such as adjacent or near views at the desired viewpoint. For example, in one embodiment bilinear interpolation can be used to interpolate among the nearest views to derive the appropriate views and hence the pixel color values at each pixel location. Then in operation 261, the data processing system can adjust the color volume mapping using the color volume mapping metadata and the angular offset metadata to adjust the color volume mapping metadata. For example, interpolation can be used to interpolate the angular offset metadata to derive the appropriate corrections or adjustments to the color volume mapping metadata based on the desired viewpoint or determined view. Then in operation 263, the data processing system can render, based upon the determined view and the final metadata, the image and then display the rendered image.

The angular view functions described herein can be implemented using a three dimensional (3D) lookup table or using the functional forms described herein. In one embodiment, the atan function can be substituted with a close approximation as is known in the art. The soft compression function can be implemented as a one-dimensional lookup table or using the functional forms described herein. For content with a large angular resolution, the amount of data may be very large. Storing the entire light field image in DRAM memory may be prohibitive in some applications. In this case, it may be desirable to store the light field image in an interleaved format, interpolating each angular view and performing the color volume mapping using a few pixels (stored in DRAM memory) at a time as opposed to storing the entire image in DRAM memory. It may also be desirable to compress the light field image, particularly for distribution through a network or set of networks (for example the Internet). This compression can take advantage of the high degree of correlation between adjacent viewpoints and can be done using JPEG, JPEG2000, HEVC, AVC, VVC, and the like, or alternately MPEG-I.

Figure 7:
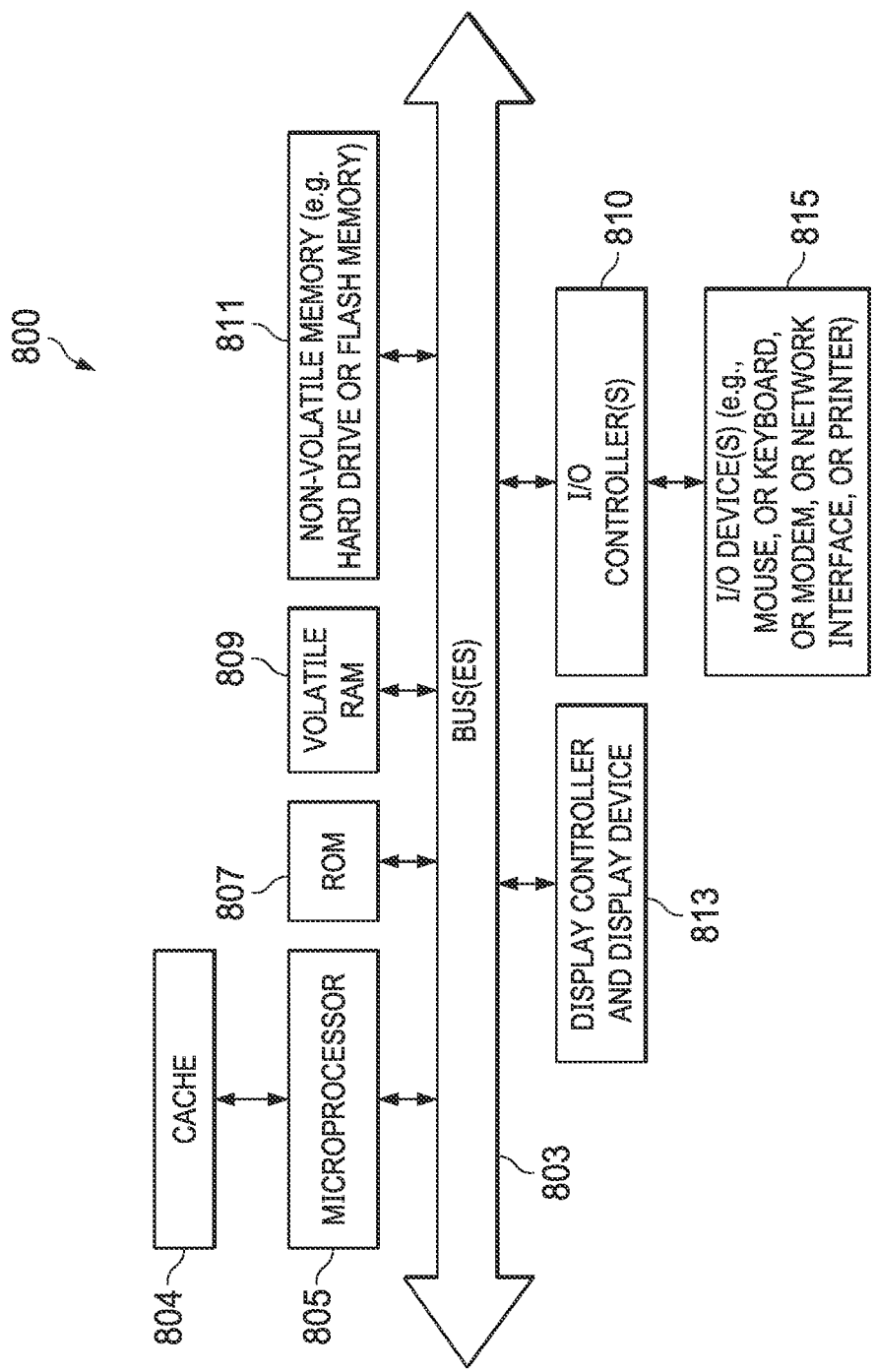
FIG. 7 is a block diagram that shows an example of a data processing system that can be used to implement one or more embodiments described herein.

FIG. 7 shows one example of a data processing system 800, which may be used with one or more embodiments described herein. For example, the system 800 may be used to perform any of the methods or calculations described herein, such as the methods shown in FIGS. 6A and 6B. The data processing system may also create light field images with associated metadata for consumption by client systems. Note that while FIG. 7 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 7, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 7 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

EXEMPLARY EMBODIMENTS

The following text presents numbered embodiments in claim like format, and it will be understood that these embodiments may be presented as claims in one or more future filings, such as one or more continuation or divisional applications. Although separate embodiments are described in detail below, however, it is appreciated that these embodiments may be combined or modified, in part or in whole.

Exemplary Embodiment 1

A method for processing data, the method comprising:
receiving image data represented in a light field format that includes image data for different views of an image for each pixel in a plurality of pixels in the image;
receiving angular range metadata for the image;
receiving a selection of a desired viewpoint relative to the image; and
determining one or more views at each pixel in the plurality of pixels using a view function that determines the one or more views, wherein the view function is based on or has inputs comprising: spatial coordinates of each pixel in the plurality of pixels in the image, the desired viewpoint, the received angular range metadata, and (1) a distance between the desired viewpoint and a display or (2) an amount of desired zoom/magnification.

Exemplary Embodiment 2

The method as in exemplary embodiment 1, wherein the image is a 4D light field image that has been previously rendered as volumetric content, and wherein the selection of the desired viewpoint is received from a user in order to see the image at the desired viewpoint, and wherein the view function is an angular view function that comprises a horizontal angular view function and a vertical angular view function; the horizontal angular view function having inputs comprising: the distance between the desired viewpoint and the display, a horizontal spatial coordinate for a pixel, and a horizontal component of the desired viewpoint; the vertical angular view function having inputs comprising: the distance between the desired viewpoint and the display, a vertical spatial coordinate for a pixel, and a vertical component of the desired viewpoint.

Exemplary Embodiment 3

The method as in exemplary embodiment 1, wherein the view function is defined relative to a reference plane at a reference distance from the display such that the view function will determine the same view for all pixels in the image for any one viewpoint in the reference plane.

Exemplary Embodiment 4

The method as in exemplary embodiment 3, wherein for a viewpoint outside of the reference plane, the view function determines different views for different pixels in the image, and wherein the desired viewpoint is selected based on an estimated viewer position or a user selected position.

Exemplary Embodiment 5

The method as in exemplary embodiment 1, wherein the method further comprises:
rendering, based on the determined one or more views, the image; and
displaying the rendered image at the determined view.

Exemplary Embodiment 6

The method as in exemplary embodiment 1, wherein the image is a 4D light field image that has been previously rendered as volumetric content that is stored in either a) a decoded planar format as tiles, each tile being one of the possible views or b) an interleaved format.

Exemplary Embodiment 7

The method as in any one of exemplary embodiments 1-6, wherein the method further comprises:
receiving color volume mapping metadata;
applying color volume mapping based on the determined one or more views and the color volume mapping metadata.

Exemplary Embodiment 8

The method as in exemplary embodiment 7, wherein the color volume mapping metadata is adjusted based on the desired viewpoint and angular offset metadata which specifies one or more adjustments to the color volume mapping metadata based on or as a function of the desired viewpoint.

Exemplary Embodiment 9

The method as in exemplary embodiment 8, wherein the method further comprises:
interpolating the angular offset metadata based on the desired viewpoint.

Exemplary Embodiment 10

The method as in exemplary embodiment 8, wherein the color volume mapping metadata varies over a plurality of different images on a scene by scene basis or an image by image basis.

Exemplary Embodiment 11

The method as in exemplary embodiment 1, wherein the method further comprises:
interpolating the determined one or more views, at the desired viewpoint, from a set of nearest available views in the image data.

Exemplary Embodiment 12

The method as in exemplary embodiment 11, wherein the interpolating uses bilinear interpolation from a dense light field image that has a sufficiently high angular density in which differences between adjacent views are either imperceptible or barely imperceptible to a viewer at a reference viewing plane.

Exemplary Embodiment 13

The method as in exemplary embodiment 1, wherein the method further comprises:
limiting viewpoints that can be a desired viewpoint to a valid viewing zone, and wherein a valid viewing zone of an image is defined by angular range metadata (for the image) that specifies a range of angles over which the image can be accurately viewed.

Exemplary Embodiment 14

The method as in exemplary embodiment 13, wherein the limiting comprises one of (a) hard clamping an invalid viewpoint to a viewpoint in the valid viewing zone or (b) soft clamping the invalid viewpoint to a viewpoint in the valid viewing zone; and wherein a hard clamping always selects a point on a border of the valid viewing zone and a soft clamping selects a set of points near, but not on, the border of the valid viewing zone.

Exemplary Embodiment 15

The method as in exemplary embodiment 14, wherein the method further comprises:
receiving metadata that includes offset metadata related to luminance metadata that specifies a statistical (e.g., average or median) luminance value of the image, the offset metadata specifying an adjustment of the luminance metadata as a function of the viewpoint.

Exemplary Embodiment 16

A data processing system programmed or configured to perform a method as in any one of Exemplary Embodiments 1-15.

Exemplary Embodiment 17

A non-transitory machine readable medium storing executable program instructions which when executed by a data processing system cause the data processing system to perform a method as in any one of Exemplary Embodiments 1-15.

Exemplary Embodiment 18

The method as in any one of exemplary embodiments 1-6, 8-14, wherein the method further comprises:
receiving color volume mapping metadata; applying color volume mapping based on the determined one or more views and the color volume mapping metadata.

Exemplary Embodiment 19

The method as in any one of exemplary embodiments 1-14, wherein the method further comprises:
receiving metadata that includes offset metadata related to luminance metadata that specifies a statistical luminance value of the image, the offset metadata for use in adjusting the luminance metadata based on the viewpoint.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

The invention claimed is:
1. A method for processing data, the method comprising:
receiving image data represented in a light field format that includes image data for different views of an image for each pixel in a plurality of pixels in the image;

receiving angular range metadata and angular offset metadata for the image, wherein the angular range metadata specifies a range of angles over which the image can be accurately viewed and the angular offset metadata is used to adjust a color volume mapping;

receiving a selection of a desired viewpoint relative to the image; and determining one or more views at each pixel in the plurality of pixels using a view function that determines the one or more views, the view function having inputs comprising:

spatial coordinates of each pixel in the plurality of pixels in the image, the angular range metadata, the desired viewpoint, and a distance between the desired viewpoint and a display.

2. The method as in claim 1, wherein the view function is an angular view function that comprises a horizontal angular view function and a vertical angular view function; the horizontal angular view function having inputs comprising: the distance between the desired viewpoint and the display, a horizontal spatial coordinate for a pixel, and a horizontal component of the desired viewpoint; the vertical angular view function having inputs comprising: the distance between the desired viewpoint and the display, a vertical spatial coordinate for a pixel, and a vertical component of the desired viewpoint.

3. The method as in claim 1, wherein the view function is defined relative to a reference plane at a reference distance from the display, and wherein the view function will determine the same view for all pixels in the image for any one viewpoint in the reference plane.

4. The method as in claim 3, wherein for a viewpoint outside of the reference plane, the view function determines different views for different pixels in the image, and wherein the desired viewpoint is selected based on an estimated viewer position or a user selection of the desired viewpoint.

5. The method according to claim 1, wherein the method further comprises:

rendering, based on the determined one or more views, the image; and displaying the rendered image at the determined view.

6. The method according to claim 1, wherein the image is a 4D light field image that has been previously rendered as volumetric content that is stored in either a) a decoded planar format as tiles, each tile being one of the possible views or b) an interleaved format.

7. The method according to claim 1, wherein the method further comprises:

receiving color volume mapping metadata;

applying color volume mapping based on the determined one or more views and the color volume mapping metadata.

8. The method as in claim 7, wherein the color volume mapping metadata is adjusted based on the desired viewpoint and the angular offset metadata which specifies one or more adjustments to the color volume mapping metadata based on, or as a function of, the desired viewpoint.

9. The method as in claim 8, wherein the method further comprises:

interpolating the angular offset metadata based on the desired viewpoint.

10. The method according to claim 7, wherein the color volume mapping metadata varies over a plurality of different images on a scene by scene basis or an image by image basis.

11. The method according to claim 1, wherein the method further comprises:

interpolating the determined one or more views, at the desired viewpoint, from a set of nearest available views in the image data.

12. The method as in claim 11, wherein the interpolating uses bilinear interpolation from a dense light field image that has sufficient angular density.

13. The method according to claim 1, wherein the method further comprises:

limiting viewpoints to a valid viewing zone, and wherein a valid viewing zone of an image is defined by the angular range metadata.

14. The method as in claim 13, wherein the limiting comprises one of (a) hard clamping an invalid viewpoint to a viewpoint in the valid viewing zone or (b) soft clamping the invalid viewpoint to a viewpoint in the valid viewing zone, wherein a hard clamping always selects a point on a border of the valid viewing zone and a soft clamping selects a set of points near, but not on, the border of the valid viewing zone.

15. The method of claim 1, further comprising:

receiving metadata that includes offset metadata related to luminance metadata that specifies a statistical luminance value of the image, the offset metadata specifying an adjustment of the luminance metadata as a function of the viewpoint.

16. The method as in claim 1, wherein the image is a 4D light field image that has been previously rendered as volumetric content, and wherein the selection of the desired viewpoint is received from a user in order to see the image at the desired viewpoint.

17. A data processing system programmed or configured to perform a method as in claim 1.

18. A non-transitory machine readable medium storing executable program instructions which when executed by a data processing system cause the data processing system to perform a method as in claim 1.

* * * * *